(12) United States Patent
Kaimai et al.

(10) Patent No.: US 7,785,735 B2
(45) Date of Patent: Aug. 31, 2010

(54) MICROPOROUS COMPOSITE MEMBRANE AND ITS PRODUCING METHOD AND USE

(75) Inventors: Norimitsu Kaimai, Kanagawa-ken (JP); Shigeaki Kobayashi, Kanagawa-ken (JP); Kotaro Kimishima, Kanagawa-ken (JP); Sadakatsu Suzuki, Saitama-ken (JP); Satoshi Ueki, Tokyo (JP); Kazuhiro Yamada, Tochigi-ken (JP)

(73) Assignee: Tonen Chemical Corporation, Tokyo (JP)

( * ) Notice: Subject to any disclaimer, the term of this patent is extended or adjusted under 35 U.S.C. 154(b) by 862 days.

(21) Appl. No.: 10/596,171

(22) PCT Filed: Dec. 2, 2004

(86) PCT No.: PCT/JP2004/017935

§ 371 (c)(1), (2), (4) Date: Feb. 8, 2007

(87) PCT Pub. No.: WO2005/054350

PCT Pub. Date: Jun. 16, 2005

(65) Prior Publication Data

US 2007/0128512 A1    Jun. 7, 2007

(30) Foreign Application Priority Data

Dec. 3, 2003    (JP) .............................. 2003-404996

(51) Int. Cl.
*H01M 2/16*    (2006.01)

(52) U.S. Cl. ........................ 429/129; 429/144; 429/145

(58) Field of Classification Search .................. 429/129, 429/144, 145
See application file for complete search history.

(56) References Cited

U.S. PATENT DOCUMENTS

| 4,863,792 A | 9/1989 | Mrozinski |
| 6,376,032 B1 | 4/2002 | Clarke et al. |

FOREIGN PATENT DOCUMENTS

| EP | 0228248 A2 | 7/1987 |
| EP | 365112 A | 4/1990 |
| JP | 60051502 | 3/1985 |
| JP | 60255106 | 12/1985 |
| JP | 2-129238 A | 5/1990 |
| JP | 07-304110 | 11/1995 |
| JP | 2000-133236 A | 5/2000 |
| JP | 2001-150583 A | 6/2001 |
| JP | 2001-153583 A | 6/2001 |
| JP | 2003-059477 | 2/2003 |
| JP | 2003-092096 | 3/2003 |
| WO | WO9638495 A1 | 12/1996 |

*Primary Examiner*—Jane Rhee
(74) *Attorney, Agent, or Firm*—Sughrue Mion, PLLC

(57) ABSTRACT

A microporous composite membrane comprising a microporous polyolefin membrane and a polypropylene-based coating layer formed on at least one surface of the microporous polyolefin membrane, the polypropylene having a mass-average molecular weight within a range of 5,000-500,000, and solubility of 0.5 g or more in 100 g of toluene at a temperature of 25° C., and the microporous composite membrane having air permeability (converted to the value at 25-μm thickness) of 50-10,000 seconds/100 cc.

3 Claims, 1 Drawing Sheet

MICROPOROUS COMPOSITE MEMBRANE AND ITS PRODUCING METHOD AND USE

FIELD OF THE INVENTION

The present invention relates to a microporous composite membrane and its production method and use, particularly to a microporous composite membrane having well-balanced permeability, mechanical strength, shutdown properties, meltdown properties and high-temperature storability, and its production method and use.

BACKGROUND OF THE INVENTION

Microporous polyolefin membranes are widely used for various applications such as separators for lithium batteries, etc., electrolytic capacitor membranes, various filters, moisture-permeable, waterproof clothes, reverse osmosis filtration membranes, ultrafiltration membranes, microfiltration membranes, etc.

To prevent the heat generation, ignition, explosion, etc. of batteries caused by the short-circuiting of external circuits, overcharge, etc., separators for lithium secondary batteries and lithium ion batteries are required to have not only a function to close fine pores when abnormal heat generation occurs, thereby stopping battery reactions, but also a function to keep their shapes even at high temperatures to prevent cathode materials and anode materials from coming into direct reaction. However, microporous polyethylene membranes produced by wet methods, which are widely used for separators at present, are vulnerable to oxidation when stored at high temperatures particularly in high-capacity batteries, resulting in lowered battery capacity, although they have high strength and low shutdown temperatures. On the other hand, separators formed by microporous polypropylene membranes produced by dry methods have low and largely variable strength, resulting in poor productivity of batteries, although they are less vulnerable to oxidation when stored at high temperatures.

As a porous film whose pores do not disappear in a wide temperature range with a high upper limit, JP7-304110 A proposes a laminated porous film obtained by alternately laminating a polypropylene film and a polyethylene film to three or more layers, and stretching the resultant laminate to make it porous.

As a microporous polyolefin membrane having excellent oxidation resistance, JP2003-92096 A proposes a microporous membrane containing 0.5% or less by mass of a polyolefin resin having a molecular weight of less than 10,000.

JP2003-59477 A proposes a battery comprising a laminated separator comprising one or more low-temperature-shrinkable microporous membranes, and one or more high-temperature-shrinkable microporous membranes having a higher endothermic temperature, which are laminated such that they are independently shrinkable. The battery of JP2003-59477 A has excellent safety because the shape of the high-temperature-shrinkable microporous membrane is maintained even at high temperatures.

However, because the laminated porous film of JP7-304110 A is produced by a dry method (method of making porous by stretching), it fails to overcome the problem of low productivity due to low and largely variable strength. In Examples of JP2003-92096 A, microporous membranes made only of polyethylene are produced, which have relatively low meltdown temperatures. Though JP2003-92096 A describes that polyethylene may be blended with polypropylene, the blend of polyethylene and polypropylene has elevated meltdown temperature and shutdown temperature, resulting in poor shutdown properties. Because the low-temperature-shrinkable membrane is vulnerable to oxidation when the separator of JP2003-59477 A is stored at high temperatures, the separator is not necessarily sufficient in a cycle life and a storing life at high temperatures.

OBJECT OF THE INVENTION

Accordingly, an object of the present invention is to provide a microporous composite membrane having well-balanced permeability, mechanical strength, shutdown properties, meltdown properties and high-temperature storability, and its production method and use.

DISCLOSURE OF THE INVENTION

As a result of intense research in view of the above object, the inventors have found that the formation of a coating layer containing polypropylene having a mass-average molecular weight within a range of 5,000-500,000, and solubility of 0.5 g or more per 100 g of toluene at a temperature of 25° C., on at least one surface of a microporous polyolefin membrane provides a microporous composite membrane with well-balanced permeability, mechanical strength, shutdown properties, meltdown properties and high-temperature storability. The present invention has been completed based on such finding.

Thus, the microporous composite membrane of the present invention comprises a microporous polyolefin membrane and a polypropylene-containing coating layer formed on at least one surface of the microporous polyolefin membrane, the polypropylene having a mass-average molecular weight within a range of 5,000-500,000, and solubility of 0.5 g or more in 100 g of toluene at a temperature of 25° C., and the microporous composite membrane having air permeability (converted to the value at 25-μm thickness) of 50-10,000 seconds/100 cc.

The mass-average molecular weight (Mw) is preferably within a range of 10,000-250,000. The solubility of the polypropylene in 100 g of toluene at a temperature of 25° C. is preferably 1 g or more, particularly 1.5 g or more. The amount of the coating layer is preferably 0.1-5 g, more preferably 0.5-3 g, per 1 $m^2$ of the microporous polyolefin membrane. The racemic diad fraction [r] of the polypropylene is preferably within a range of 0.07-0.93, more preferably within a range of 0.12-0.88, particularly within a range of 0.16-0.84.

The microporous composite membranes according to preferred embodiments of the present invention have the following properties (1)-(6):

(1) Porosity of 25-95%, preferably 30-90%, more preferably 35-85%.

(2) Air permeability (converted to the value at 25-μm thickness) of 100-3,000 seconds/100 cc.

(3) Pin puncture strength of 5,000 mN/25 μm or more.

(4) Shutdown temperature of 120-140° C.

(5) Meltdown temperature of 155° C. or higher.

(6) Battery capacity recovery ratio after storing at 80° C. for 30 days [(battery capacity after storing/initial battery capacity)×100] of 70% or more when assembled in a lithium secondary battery.

The method of the present invention for producing a microporous composite membrane comprises (a) applying a mixed liquid containing the polypropylene and its good solvent to at least one surface of the microporous polyolefin membrane, removing the good solvent to increase the concentration of the polypropylene, thereby providing the resultant coating layer with a structure in which the polypropylene phase is separated from the good solvent phase, and then removing the remainder of the good solvent; (b) applying the mixed liquid to at least one surface of the microporous polyolefin membrane, cooling the resultant coating layer to provide the coating layer with a structure in which the polypropylene phase is separated from the good solvent phase, and removing the good solvent; (c) applying the mixed liquid to at least one surface of the microporous polyolefin membrane, bringing the resultant coating layer into contact with a poor solvent for the polypropylene, selectively evaporating the good solvent to provide the coating layer with a structure in which the polypropylene phase is separated from the poor solvent phase, and then removing the poor solvent; or (d) applying a mixed liquid containing the polypropylene, the good solvent and the poor solvent to at least one surface of the microporous polyolefin membrane, selectively removing the good solvent to provide the resultant coating layer with a structure in which the polypropylene phase is separated from the poor solvent phase, and then removing the poor solvent.

In any of the above methods (a)-(d), the concentration of polypropylene in the mixed liquid applied is preferably 0.5-10% by mass.

To provide the microporous composite membrane with better properties, the polypropylene preferably meets the following conditions (7)-(16).

(7) The polypropylene is produced by a coordination polymerization method using a uniform or non-uniform metal complex catalyst.

(8) The polypropylene described in (7) above is obtained by removing a by-produced crystalline polypropylene.

(9) The uniform metal complex catalyst described in (7) above is a catalyst comprising a vanadium complex and an organoaluminum compound.

(10) The polypropylene is a composition comprising two or more types of polypropylene having different racemic diad fractions [r] and/or Mws.

(11) The polypropylene is treated with a modifying agent represented by the following general formula (1):

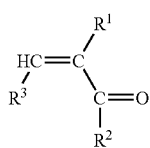

wherein $R^1$ represents a hydrogen atom, or an alkyl group having 1-10 carbon atoms; $R^2$ represents an $OR^4$ group [$R^4$ represents a hydrogen atom, an alkyl group having 1-10 carbon atoms, which may have a halogen group, an aromatic group which may have an alkyl group, a —$(CH_2)_a$—O—P(O)($OR^1$)$_2$ group, a —$(CH_2)_a$—O—P(O)(O)(O—$(CH_2)_b$—$N^+R^1{}_3$) group, wherein a and b are respectively integers of 1-5, an alkali metal selected from the group consisting of Li, Na and K, an alicyclic hydrocarbon group having 5-10 carbon atoms, a glycidyl group, an —$R^5$—$COCR^1$=$CH_2$ group, wherein $R^5$ represents an alkylene group having 1-10 carbon atoms or a —$[(CH_2)_q$—O—$]_r$— group, wherein q and r are respectively integers of 1-5, an —$R^5OR^1$ group, an —$R^5Si(OR^1)_3$ group, or an —$R^5$—NCO group], an —$NR^1{}_2$ group, an —$R^5$—$NR^1{}_2$ group, or a halogen group selected from the group consisting of Cl, Br, F and I; and $R^3$ represents a hydrogen atom, or a —$COR^2$ group, and/or a modifying agent represented by the following general formula (2):

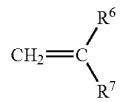

wherein $R^6$ represents a hydrogen atom or an alkyl group having 1-10 carbon atoms, or a halogen group selected from the group consisting of Cl, Br, F and I; $R^7$ represents an —Ar—X' group (X' represents an $R^6$ group, an —OH group, a —COOH group, an —$NH_2$ group, a —CN group, an —$NO_2$ group, a halogenated alkyl group having 1-10 carbon atoms, a —CH=$CH_2$ group, or an —OCO—$R^6$ group), an —OCO—$R^6$ group, a —CHO group, a —$COR^E$ group, a —CN group, a pyridyl group, a pyrrolidonyl group, an —Si(OR')$_3$ group ($R^1$ represents hydrogen atom, or an alkyl group having 1-10 carbon atoms), a halogenated alkyl group having 1-10 carbon atoms, a halogen group, an —$OR^6$ group, an —$OSO_3M$ group (M represents an alkali metal selected from the group consisting of Li, Na and K), or an —NH—CO—$R^6$ group. These definitions are similarly applicable below.

(12) The compound represented by the general formula (1) described in (11) above is at least one selected from the group consisting of (meth)acrylic acid and its alkyl esters, glycidyl esters, alkali metal salts of (meth)acrylic acid and its halides, and (meth)acrylic acid derivatives containing an —OH group, an alkoxyl group, an amino group and an isocyanate group.

(13) The compound represented by the general formula (2) described in (11) above is at least one selected from the group consisting of styrene derivatives, vinyl compounds and unsaturated dicarboxylic acids.

(14) The amount of the modifying agent described in any one of (11)-(13) above is 1-500, more preferably 1-400, particularly 1-300, by the number of molecules per one polypropylene molecule.

(15) The polypropylene is a composition comprising polypropylene treated with the modifying agent described in any one of (11)-(13) above, and unmodified polypropylene, in which these types of polypropylene may have the same or different racemic diad fractions [r] and Mws.

(16) The polypropylene is a composition comprising two or more types of polypropylene treated with different modifying agents described in any one of (11)-(13) above, in which they may have the same or different racemic diad fractions [r] and Mws.

To provide the microporous composite membrane with better properties, the microporous polyolefin membrane preferably meets the following conditions (17)-(23).

(17) The porosity is 25-95%.

(18) The air permeability (JIS P8117, converted to the value at 25-μm thickness) is 50-10,000 seconds/100 cc, more preferably 100-3,000 seconds/100 cc.

(19) The average penetrating pore diameter is 0.005-1 μm.

(20) The tensile rupture strength is 100 MPa or more.

(21) The pin puncture strength is 5,000 mN/25 μm or more.

(22) The heat shrinkage ratio (105° C./8 hours) is 15% or less in both longitudinal direction (MD) and transverse direction (TD).

(23) The thickness is 5-200 μm.

To provide the microporous composite membrane with better properties, the polyolefin preferably meets the following conditions (24)-(32).

(24) The polyolefin comprises polyethylene or a polyethylene composition.

(25) The polyethylene described in (24) above has Mw of $1 \times 10^4$ to $5 \times 10^6$.

(26) The polyethylene described in (25) above has Mw of $1 \times 10^5$ to $4 \times 10^6$.

(27) The polyethylene described in any one of (24)-(26) above is at least one selected from the group consisting of ultra-high-molecular-weight polyethylene, high-density polyethylene, intermediate-density polyethylene, and low-density polyethylene.

(28) The polyethylene described in any one of (24)-(27) above is ultra-high-molecular-weight polyethylene having Mw of $5 \times 10^5$ or more.

(29) The polyethylene described in any one of (24)-(28) above has Mw/Mn (molecular weight distribution), a ratio of its mass-average molecular weight (Mw) to its number-average molecular weight (Mn), of 5-300.

(30) The polyethylene composition described in (24) above comprises ultra-high-molecular-weight polyethylene as an indispensable component, and further at least one selected from the group consisting of high-density polyethylene, intermediate-density polyethylene and low-density polyethylene.

(31) The polyethylene composition described in (30) above comprises ultra-high-molecular-weight polyethylene having Mw of $5 \times 10^5$ or more and high-density polyethylene having Mw of $1 \times 10^4$ or more and less than $5 \times 10^5$.

(32) The polyethylene composition described in (30) or (31) above comprises, as an optional component, at least one polyolefin selected from the group consisting of (a) polypropylene, polybutene-1, ethylene α-olefin copolymers, polypentene-1, polyhexene-1, poly4-methylpentene-1, polyoctene, polyvinyl acetate, polymethyl methacrylate and polystyrene each having Mw within a range of $1 \times 10^4$ to $4 \times 10^6$; and (b) polyethylene wax having Mw within a range of $1 \times 10^3$ to $4 \times 10^4$.

The microporous composite membrane of the present invention is useful for battery separators.

DESCRIPTION OF THE PREFERRED EMBODIMENTS

Figure 1:
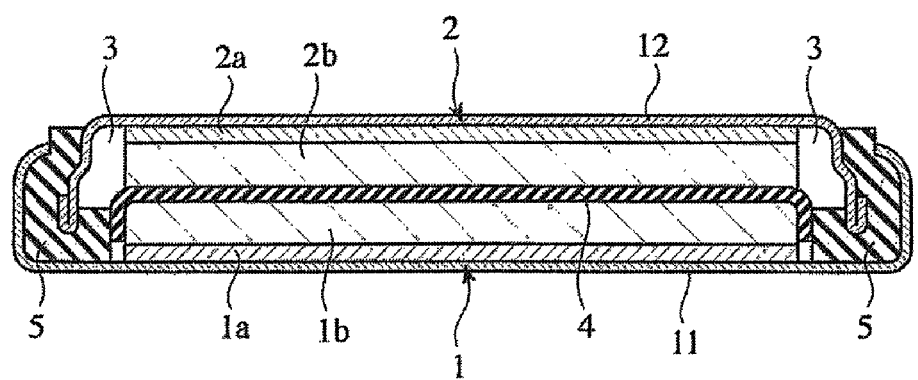
FIG. 1 is a schematic cross-sectional view showing a coin-shaped, lithium secondary battery according to one embodiment of the present invention.

[1] Microporous Polyolefin Membrane
(1) Polyolefin

The microporous polyolefin membrane may be constituted by one type of polyolefin or a composition of two or more types of polyolefins, and the polyolefin preferably comprises polyethylene. Though not particularly restricted, the mass-average molecular weight (Mw) of polyethylene is usually $1 \times 10^4$ to $1 \times 10^7$, preferably $1 \times 10^4$ to $5 \times 10^6$, more preferably $1 \times 10^5$ to $4 \times 10^6$.

The polyethylene usable includes ultra-high-molecular-weight polyethylene, high-density polyethylene, intermediate-density polyethylene and low-density polyethylene. Among them, the ultra-high-molecular-weight polyethylene is preferable. The Mw of the ultra-high-molecular-weight polyethylene is preferably $5 \times 10^5$ or more, more preferably $1 \times 10^6$ to $15 \times 10^6$, particularly $1 \times 10^6$ to $5 \times 10^6$. The above-described types of polyethylene may be copolymers containing small amounts of other α-olefins. The α-olefins other than ethylene may be propylene, butene-1, pentene-1, hexene-1, 4-methylpentene-1, octene, vinyl acetate, methyl methacrylate, styrene, etc.

Regardless of whether or not the polyethylene is a single type of polyethylene or a composition comprising two or more types of polyethylene, its Mw/Mn (molecular weight distribution), a ratio of its mass-average molecular weight (Mw) to its number-average molecular weight (Mn), is preferably within a range of 5-300, more preferably within a range of 10-100, though not particularly restricted. To control the molecular weight distribution, the polyethylene may be produced by multi-stage polymerization. Of course, polyethylene produced by a single-stage polymerization may be used.

The polyolefin composition is preferably a composition comprising the above ultra-high-molecular-weight polyethylene. The polyolefin composition comprising the above ultra-high-molecular-weight polyethylene further comprises preferably at least one selected from the group consisting of high-density polyethylene, intermediate-density polyethylene and low-density polyethylene, more preferably high-density polyethylene. Each of the high-density polyethylene, the intermediate-density polyethylene and the low-density polyethylene preferably has Mw of $1 \times 10^4$ or more and less than $5 \times 10^5$.

The polyolefin composition comprising the above ultra-high-molecular-weight polyethylene may contain, as an optional component, at least one polyolefin selected from the group consisting of (a) polypropylene, polybutene-1, ethylene α-olefin copolymers, polypentene-1, polyhexene-1, poly4-methylpentene-1, polyoctene, polyvinyl acetate, polymethyl methacrylate and polystyrene each having Mw within a range of $1 \times 10^4$ to $4 \times 10^6$; and (b) polyethylene wax having Mw within a range of $1 \times 10^3$ to $4 \times 10^4$. The amount of the optional polyolefin is preferably 80 parts or less by mass per 100 parts by mass of the entire polyolefin composition.

(2) Production Method

To produce the microporous polyolefin membrane, for instance, the method disclosed by JP6-104736B may be used, without intension of restriction. Using the method of JP6-104736B, the microporous polyolefin membrane can be produced by (i) adding a membrane-forming solvent to the above polyolefin, melt-blending it to prepare a polyolefin solution, (ii) extruding the polyolefin solution through a die lip, and cooling it to form a gel-like molding, (iii) stretching the gel-like molding, (iv) removing the membrane-forming solvent from the stretched membrane with a washing solvent, and (v) drying the membrane.

(3) Desired Properties

The microporous polyolefin membrane used in the present invention preferably has a porosity of 25-95%, an air permeability (JIS P8117, converted to the value at 25-μm thickness) of 50-10,000 seconds/100 cc, more preferably 100-3,000 seconds/100 cc, an average penetrating pore diameter of 0.005-1 μm, a tensile rupture strength of 100 MPa or more, a pin puncture strength of 5,000 mN/25 μm or more, a heat shrinkage ratio (105° C./8 hours) of 15% or less in both longitudinal direction (MD) and transverse direction (TD), and a thickness of 5-200 μm.

[2] Coating Layer

The microporous composite membrane of the present invention is provided with a coating layer containing polypropylene having Mw within a range of 5,000-500,000 and solubility of 0.5 g or more in 100 g of toluene at a temperature of 25° C.

(1) Polypropylene

The Mw of the polypropylene is 5,000-500,000, preferably 10,000-250,000. When the polypropylene has Mw of less than 5,000, it does not have sufficient thermal stability. On the other hand, when the Mw is more than 500,000, a coating liquid having an appropriate concentration has too high viscosity, resulting in difficulty in uniformly applying it to the microporous membrane. The molecular weight distribution (Mw/Mn) of the polypropylene is preferably 1.01-100, more preferably 1.1-50.

The solubility of the polypropylene in 100 g of toluene at a temperature of 25° C. is 0.5 g or more, preferably 1 g or more, particularly 1.5 g or more. When this solubility is less than 0.5 g, it is difficult to prepare the coating liquid.

The repeating units of polypropylene can have three configurations, called isotactic, syndiotactic and atactic. Isotactic polypropylene has such a stereochemical structure that asymmetric carbon atoms have the same three-dimensional arrangement along the polypropylene skeleton, namely methyl groups in continuing monomer units are arranged on the same side of a plane passing through the polypropylene skeleton (for instance, all methyl groups are above the plane). Syndiotactic polypropylene has such a stereochemical structure that two monomer units in a mirror-image isomerism relation (racemic diad: asymmetric carbon atoms in two connected monomer units are in staggering positions) are regularly arranged along the polypropylene skeleton (methyl groups in the continuing monomers units in the chain exist alternately on both sides of a hypothetical plane passing through the polypropylene skeleton). Atactic polypropylene has such a stereochemical structure that asymmetric carbon atoms are randomly arranged along the polypropylene skeleton.

A racemic diad fraction [r] is an index of the stereoregularity of polypropylene, specifically representing the syndiotacticity of polypropylene. For instance, when the racemic diad fraction [r] is 1, namely 100%, the polypropylene is totally syndiotactic. The racemic diad fraction [r] is obtained from the integrated peak intensity of a stereoregular structure measured by well-known $^{13}$C-NMR.

Though not particularly restricted, the racemic diad fraction [r] of polypropylene is preferably within a range of 0.07-0.93, more preferably within a range of 0.12-0.88, particularly within a range of 0.16-0.84. When the racemic diad fraction [r] is less than 0.07 or more than 0.93, the polypropylene has low solubility in organic solvents.

As long as the polypropylene has Mw within a range of 5,000-500,000 and solubility of 0.5 g or more in 100 g of toluene at a temperature of 25° C., it may be copolymers with other olefins or diolefins. The other olefins are preferably ethylene or α-olefins. The α-olefins preferably have 4-8 carbon atoms. The α-olefins having 4-8 carbon atoms include, for instance, 1-butene, 1-hexene, 4-methyl-1-pentene, etc. The diolefins preferably have 4-14 carbon atoms. The diolefins having 4-14 carbon atoms are, for instance, butadiene, 1,5-hexadiene, 1,7-octadiene, 1,9-decadiene, etc. The amount of the other olefin or diolefin is preferably less than 10 mol % per 100 mol % of the propylene copolymer.

A single type of polypropylene or a composition comprising two or more types of polypropylene may be used. The polypropylene composition may be, for instance, (i) a composition comprising two or more types of polypropylene having different racemic diad fractions [r] and/or Mws, (ii) a composition comprising polypropylene treated with a modifying agent, and unmodified polypropylene, which may have the same or different racemic diad fractions [r] and Mws, (iii) a composition comprising two or more types of polypropylene treated with different modifying agents, which may have the same or different racemic diad fractions [r] and Mws, etc.

(2) Preparation Method of Polypropylene

The polypropylene described in (1) above is preferably produced by the polymerization of propylene in a solvent using uniform and/or non-uniform metal complex catalysts, though not restricted. The solvents may be saturated aliphatic hydrocarbons such as propane, butane, pentane, hexane, heptane, etc.; saturated alicyclic hydrocarbons such as cyclopropane, cyclohexane, etc.; aromatic hydrocarbons such as benzene, toluene, xylene, etc.; tetrahydrofuran (THF), etc. The polymerization of propylene may be conducted in a propylene liquid or gas phase without using a solvent.

(A) Uniform Metal Complex Catalysts

The uniform metal complex catalysts may be metal complex catalysts comprising organic compounds having heteroatoms such as oxygen, nitrogen, etc. and transition metals, catalysts comprising organic metal compounds and organoaluminum compounds, etc. Specific examples of the uniform metal complex catalysts are as follows:

(i) Catalysts comprising vanadium complexes and organoaluminum compounds;

(ii) Catalysts comprising (ii-1) alkoxy and/or alkyl amino complexes containing at least one metal selected from the group consisting of titanium, zirconium and hafnium, and (ii-2) at least one selected from the group consisting of aluminoxanes, boron compounds and organoaluminum compounds;

(iii) Catalysts comprising (iii-1) complexes (metallocene compounds) containing at least one metal selected from the group consisting of titanium, zirconium and hafnium, with two cycloalkadienyl groups or their derivatives and a halogen group or an alkyl group, and (iii-2) at least one selected from the group consisting of aluminoxanes, boron compounds and organoaluminum compounds;

(iv) Catalysts comprising (iv-1) compounds of at least one metal selected from the group consisting of titanium, zirconium and hafnium, with one cycloalkadienyl group or its derivative together with an alkoxyl group and/or an alkyl amino group, and (iv-2) at least one selected from the group consisting of aluminoxanes, boron compounds and organoaluminum compounds;

(v) Catalysts comprising diimine complexes of nickel, palladium, etc., and aluminoxanes;

(vi) Catalysts comprising titanium diamide complexes and organoaluminum;

(vii) Catalysts comprising phenoxyimine complexes of titanium, zirconium, hafnium, etc., and aluminoxanes;

(viii) Catalysts comprising pyrrole-imine complexes of titanium, etc., and aluminoxanes, etc.

(a) Catalysts (i)

The vanadium complexes in the above catalysts (i), which are described, for instance, in Makromol. Chem. 180, pp. 57-64(1979), are specifically VOCl$_3$, VCl$_4$, V(acetylacetonato)$_3$, V(2-Me-1,3-butanedionato)$_3$, V(1,3-butanedionato)$_3$, VO(acetylacetonato)$_2$, VOCl$_2$(acetylacetonato), VOCl(acetylacetonato)$_2$, VO(OR)$_3$ (OR represents an alkoxyl group), V(benzoylacetonato)$_3$, V(benzoyltrifluoroacetonato)$_3$, V(dibenzoylmethanato)$_3$, V(furoylacetonato)$_3$, V(trifluoroacetylacetonato)$_3$, V(3-phenylacetylacetonato)$_3$, V(2,4-hexanedionato)$_3$, V(trifluorodimethyl-2,4-hexanedionato)$_3$, etc.

The vanadium complexes may also be those having ligands of alkyl imides or aryl imides, etc., which are represented by the following general formula (3):

(3)

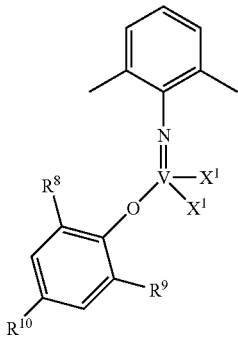

wherein $X^1$ represents F, Cl, Br, I, a hydrocarbon group having 1-10 carbon atoms or an alkoxyl group having 1-8 carbon atoms, and $R^8$-$R^{10}$ independently represent alkyl groups having 1-4 carbon atoms, or by the following general formula (4):

(4)

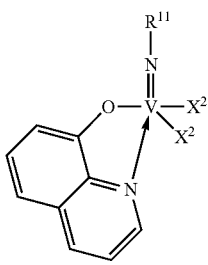

wherein $X^2$ represents F, Cl, Br, I, a hydrocarbon group having 1-10 carbon atoms, or an alkoxyl group having 1-8 carbon atoms, and $R^{11}$ represents an alkyl group having 1-4 carbon atoms.

The organoaluminum compounds may be, for instance, alkyl aluminum halides such as dimethylaluminum chloride, diethylaluminum chloride, diethylaluminum bromide, diethylaluminum iodide, diisobutylaluminum chloride, ethylaluminum sesquichloride, ethylaluminum dichloride, isobutylaluminum dichloride, ethylaluminum dibromide, etc.; aluminoxanes such as methylaluminoxane, etc.

The catalysts (i) may contain electron donors, if necessary. The electron donors may be oxygen-containing electron donors such as alcohols, phenols, ketones, aldehydes, carboxylic acids, malonic acid, esters of organic or inorganic acids, monoethers, diethers or polyethers, etc.; nitrogen-containing electron donors such as ammonia, amines, nitriles, isocyanates, etc. The amount of the electron donor used may be 0.01-20 mol per 1 mol of the vanadium complex.

The molecular weight, molecular weight distribution and yield of the polypropylene can be adjusted by controlling reaction temperature and time. The amount of the vanadium complex is $1 \times 10^{-5}$ to 0.1 mol, preferably $1 \times 10^{-4}$ to $5 \times 10^{-2}$ mol, per 1 mol of propylene. The amount of the organoaluminum compound is $1 \times 10^{-4}$ to 0.1 mol, preferably $5 \times 10^{-3}$ to 0.05 mol, per 1 mol of propylene. The polymerization reaction is conducted at a temperature of $-100°$ C. to $+100°$ C. for 0.5-50 hours, preferably at a temperature of $-90°$ C. to $+50°$ C. for 1-30 hours, more preferably at a temperature of $-80°$ C. to $+30°$ C. for 1-15 hours.

(b) Catalysts (ii)

When the above catalysts (ii) are used, specific examples of the above complexes (ii-1) include compounds represented by the following general formulae (5)-(10):

$$M^1(OR^{12})_aX^3_{4-a} \quad (5),$$

$$M^1(NR^{12}_2)_aX^3_{4-a} \quad (6),$$

$$M^1Y^1_2X^3_2 \quad (7),$$

$$(OR^{13}O)M^1X^3_2 \quad (8),$$

$$[OR^{13}N(R^{14})]M^1X^3_2 \quad (9), \text{ and}$$

$$[N(R^{14})R^{13}N(R^{14})]M^1X^3_2 \quad (10),$$

wherein $M^1$ represents Ti, Zr or Hf, $R^{12}$ represents a hydrocarbon group having 1-10 carbon atoms, $R^{13}$ represents a bivalent aromatic group, a bivalent alicyclic hydrocarbon group, a bivalent aliphatic hydrocarbon group, or a bivalent organic group containing a hetero-element such as oxygen, nitrogen, silicon, etc., $R^{14}$ represents a monovalent aromatic group, a monovalent alicyclic hydrocarbon group or a monovalent aliphatic hydrocarbon group, $X^3$ represents F, Cl, Br or I, a represents an integer of 2-4, and $Y^1$ represents an acetylacetone ligand, a methylbutanedione ligand, a butanedione ligand, a benzoyl acetone ligand, a benzoyl trifluoroacetone ligand, a dibenzoyl methane ligand, a furoylacetone ligand, a trifluoroacetylacetone ligand, a 3-phenylacetylacetone ligand, a 2,4-hexanedione ligand, a trifluorodimethyl-2,4-hexanedione ligand, etc.

The above complexes (ii-1) are specifically $Ti(OC_2H_5)_4$, $Ti(O-n-C_3H_7)_4$, $Ti(O-i-C_3H_7)_4$, $Ti(O-n-C_4H_9)_4$, $Ti(O-i-C_4H_9)_4$, $Ti(O-s-C_4H_9)_4$, $Ti(O-t-C_4H_9)_4$, $Ti(O-cycloC_5H_9)_4$, $Ti(OC_5H_{11})_4$, $Ti(OC_6H_5)_4$, $Ti(O-cycloC_6H_{11})_4$, $Ti(OC_6H_{13})_4$, $Ti(OC_2H_5)_2Cl_2$, $Ti(O-i-C_3H_7)_2Cl_2$, $Ti(O-n-C_3H_7)_2Br_2$, $Ti(O-n-C_4H_9)_2Cl_2$, $Ti(O-i-C_4H_9)_2Br_2$, $Ti(O-s-C_4H_9)_2I_2$, $Ti(OC_5H_{11})_2Cl_2$, $Ti(O-cycloC_6H_{11})_2F_2$, $Ti[N(C_2H_5)_2]_4$, $Ti[N(n-C_3H_7)_2]_4$, $Ti[N(i-C_3H_7)_2]_4$, $Ti[N(n-C_4H_9)_2]_4$, $Ti[N(i-C_4H_9)_2]_4$, $Ti[N(s-C_4H_9)_2]_4$, $Ti[N(t-C_4H_9)_2]_4$, $Ti[N(cycloC_5H_9)_2]_4$, $Ti[N(C_5H_{11})_2]_4$, $Ti[N(C_6H_5)_2]_4$, $Ti[N(cycloC_6H_{11})_2]_4$, $Ti[N(C_6H_{13})_2]_4$, $Ti[N(C_2H_5)_2]_2Cl_2$, $Ti[N(n-C_3H_7)_2]_2Cl_2$, $Ti[N(i-C_3H_7)_2]_2Br_2$, $Ti[N(s-C_4H_9)_2]_2Cl_2$, $Ti[N(n-C_4H_9)_2]_2Br_2$, $Ti[N(t-C_4H_9)_2]_2$, $Ti[N(C_5H_{11})_2]_2F_2$, $Ti[N(C_5H_{11})_2]_2Cl_2$, $Ti(acetylacetonato)_2Cl_2$, $Ti(methylbutanedionato)_2Cl_2$, $Ti(butanedionato)_2Cl_2$, $Ti(benzoylacetonato)_2Br_2$, $Ti(benzoyltrifluoroacetonato)_2F_2$, $Ti(dibenzoylmethanato)_2I_2$, $Ti(furoylacetonato)_2Br_2$, $Ti(trifluoroacetylacetonato)_2Br_2$, $Ti(2,4-hexanedionato)_2Cl_2$, $Zr(OC_2H_5)_4$, $Zr(O-n-C_3H_7)_4$, $Zr(O-i-C_3H_7)_4$, $Zr(O-n-C_4H_9)_4$, $Zr(O-i-C_4H_9)_4$, $Zr(O-s-C_4H_9)_4$, $Zr(O-t-C_4H_9)_4$, $Zr(O-cycloC_5H_9)_4$, $Zr(OC_5H_{11})_4$, $Zr(OC_6H_5)_4$, $Zr(O-cycloC_6H_{11})_4$, $Zr(OC_6H_{13})_4$, $Zr(OC_2H_5)_2Cl_2$, $Zr(O-i-C_3H_7)_2Cl_2$, $Zr(O-n-C_3H_7)_2Br_2$, $Zr(O-n-C_4H_9)_2Cl_2$, $Zr(O-i-C_4H_9)_2Br_2$, $Zr(O-s-C_4H_9)_2I_2$, $Zr(OC_5H_{11})_2Cl_2$, $Zr(O-cycloC_6H_{11})_2F_2$, $Zr[N(C_2H_5)_2]_4$, $Zr[N(n-C_3H_7)_2]_4$, $Zr[N(i-C_3H_7)_2]_4$, $Zr[N(n-C_4H_9)_2]_4$, $Zr[N(i-C_4H_9)_2]_4$, $Zr[N(s-C_4H_9)_2]_4$, $Zr[N(t-C_4H_9)_2]_4$, $Zr[N(cycloC_5H_9)_2]_4$, $Zr[N(C_5H_{11})_2]_4$, $Zr[N(C_6H_5)_2]_4$, $Zr[N(cycloC_6H_{11})_2]_4$, $Zr[N(C_6H_{13})_2]_4$, $Zr[N(C_2H_5)_2]_2Cl_2$, $Zr[N(n-C_3H_7)_2]_2Cl_2$, $Zr[N(i-C_3H_7)_2]_2Br_2$, $Zr[N(s-C_4H_9)_2]_2Cl_2$, $Zr[N(n-C_4H_9)_2]_2Br_2$, $Zr[N(t-C_4H_9)_2]_2I_2$, $Zr[N(C_5H_{11})_2]_2F_2$, $Zr[N(C_5H_{11})_2]_2Cl_2$, $Zr(acetylacetonato)_2Cl_2$, $Zr(methylbutanedionato)_2Cl_2$, $Zr(butanedionato)_2Cl_2$, $Zr(benzoylacetonato)_2Br_2$, $Zr(benzoyltrifluoroacetonato)_2F_2$, $Zr(dibenzoylmethanato)_2I_2$, $Zr(furoylacetonato)_2Br_2$, $Zr(trifluoroacetylacetonato)_2Br_2$, $Zr(2,4-hexanedionato)_2Cl_2$, $Hf(OC_2H_5)_4$, $Hf(O-n-C_3H_7)_4$, $Hf(O-i-C_3H_7)_4$, Hf(O-n-C$_4$H$_9$)$_4$, Hf(O-i-C$_4$H$_9$)$_4$, Hf(O-s-C$_4$H$_9$)$_4$, Hf(O-t-C$_4$H$_9$)$_4$, Hf(O-cycloC$_5$H$_9$)$_4$, Hf(OC$_5$H$_{11}$)$_4$, Hf(OC$_6$H$_5$)$_4$, Hf(O-cycloC$_6$H$_{11}$)$_4$, Hf(OC$_6$H$_{13}$)$_4$, Hf(OC$_2$H$_5$)$_2$Cl$_2$, Hf(O-i-C$_3$H$_7$)$_2$Cl$_2$, Hf(O-n-C$_3$H$_7$)$_2$Br$_2$, Hf(O-n-C$_4$H$_9$)$_2$Cl$_2$, Hf(O-i-C$_4$H$_9$)$_2$Br$_2$, Hf(O-s-C$_4$H$_9$)$_2$I$_2$, Hf(OC$_5$H$_{11}$)$_2$Cl$_2$, Hf(O-cycloC$_6$H$_{11}$)$_2$F$_2$, Hf[N(C$_2$H$_5$)$_2$]$_4$, Hf[N(n-C$_3$H$_7$)$_2$]$_4$, Hf[N(i-C$_3$H$_7$)$_2$]$_4$, Hf[N(n-C$_4$H$_9$)$_2$]$_4$, Hf[N(i-C$_4$H$_9$)$_2$]$_4$, Hf[N(s-C$_4$H$_9$)$_2$]$_4$, Hf[N(t-C$_4$H$_9$)$_2$]$_4$, Hf[N(cycloC$_5$H$_9$)$_2$]$_4$, Hf[N(C$_5$H$_{11}$)$_2$]$_4$, Hf[N(C$_6$H$_5$)$_2$]$_4$, Hf[N(cycloC$_6$H$_{11}$)$_2$]$_4$, Hf[N(C$_6$H$_{13}$)$_2$]$_4$, Hf[N(C$_2$H$_5$)$_2$]$_2$Cl$_2$, Hf[N(n-C$_3$H$_7$)$_2$]$_2$Cl$_2$, Hf[N(i-C$_3$H$_7$)$_2$]$_2$Br$_2$, Hf[N(s-C$_4$H$_9$)$_2$]$_2$Cl$_2$, Hf[N(n-C$_4$H$_9$)$_2$]$_2$Br$_2$, Hf[N(t-C$_4$H$_9$)$_2$]$_2$I$_2$, Hf[N(C$_5$H$_{11}$)$_2$]$_2$F$_2$, Hf[N(C$_5$H$_{11}$)$_2$]$_2$Cl$_2$, Hf(acetylacetonato)$_2$Cl$_2$, Hf(methylbutanedionato)$_2$Cl$_2$, Hf(butanedionato)$_2$Cl$_2$, Hf(benzoylacetonato)$_2$Br$_2$, Hf(benzoyltrifluoroacetonato)$_2$F$_2$, Hf(dibenzoylmethanato)$_2$I$_2$, Hf(furoylacetonato)$_2$Br$_2$, Hf(trifluoroacetylacetonato)$_2$Br$_2$, Hf(2,4-hexanedionato)$_2$Cl$_2$, etc.

The above aluminoxanes (ii-2) include, for instance, methylaluminoxane, ethylaluminoxane, isobutylaluminoxane, dry aluminoxane purified by removing unreacted aluminum compounds from these aluminoxanes, etc. The boron compounds include, for instance, triphenyl borane, tris(pentafluorophenyl) borane, triphenylmethyl-tris(pentafluoro) borate, etc. Though the boron compounds may be used alone, they may be combined with organoaluminum compounds such as trialkyl aluminum and alkyl aluminum halides. The organoaluminum compounds may be, for instance, dimethylaluminum chloride, diethylaluminum chloride, diethylaluminum bromide, diisobutylaluminum chloride, dioctylaluminum chloride, ethylaluminum sesquichloride, etc.

The amount of the above complex (ii-1) is $1\times10^{-5}$ to 0.5 mol, preferably $1\times10^{-4}$ to 0.1 mol, per 1 mol of propylene. The amount of the above compound (ii-2) is $1\times10^{-6}$ to 0.5 mol, preferably $1\times10^{-5}$ to 0.1 mol, per 1 mol of propylene. The polymerization reaction is conducted at a temperature of $-100°$ C. to $+100°$ C. for 0.5-50 hours, preferably at a temperature of $-80°$ C. to $+80°$ C. for 1-30 hours.

(c) Catalysts (iii)

When the above catalysts (iii) are used, the above complexes (iii-1) (metallocene compounds) may be uncross-linked metallocene compounds in which two cycloalkadienyl groups or their derivatives are not cross-linked, one-cross-linked metallocene compounds having one cross-linked portion, or two-cross-linked metallocene compounds having two cross-linked portions.

The uncross-linked metallocene compounds may be, for instance, compounds represented by the following general formulae (11)-(13):

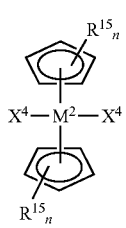

(11)

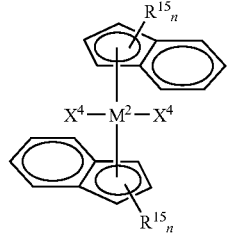

(12)

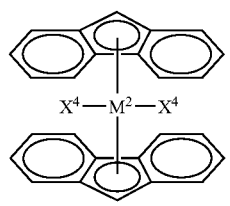

(13)

wherein M$^2$ represents Ti, Zr or Hf, X$^4$ represents a halogen group, an aliphatic hydrocarbon group having 1-8 carbon atoms, or an aromatic hydrocarbon group having 6-10 carbon atoms, R$^{15}$ represents a hydrogen atom, an aliphatic, aromatic or alicyclic hydrocarbon group having 1-8 carbon atoms, and n represents an integer of 1-3.

Specific examples of the uncross-linked metallocene compounds include cyclopentadienyl-fluorenyl zirconium dichloride, cyclopentadienyl-fluorenyl zirconium dimethyl, cyclopentadienyl-fluorenyl zirconium diethyl, cyclopentadienyl-fluorenyl titanium dichloride, cyclopentadienyl-fluorenyl hafnium dichloride, (C$_5$H$_5$)$_2$Zr(C$_6$H$_5$)$_2$, (C$_5$H$_4$-i-C$_3$H$_7$)$_2$ZrCl$_2$, (C$_5$H$_4$-t-C$_4$H$_9$)$_2$ZrCl$_2$, (C$_5$H$_4$-t-C$_4$H$_9$)$_2$ZrBr$_2$, (C$_5$H$_4$-t-C$_4$H$_9$)$_2$ZrI$_2$, (C$_5$H$_4$-t-C$_4$H$_9$)$_2$ZrF$_2$, (C$_5$H$_4$-t-C$_4$H$_9$)$_2$Zr(CH$_3$)$_2$, (C$_5$H$_4$-t-C$_4$H$_9$)$_2$Zr(C$_6$H$_5$)$_2$, [C$_5$H$_4$—CH(CH$_3$)(C$_6$H$_5$)]$_2$ZrCl$_2$, etc.

The one-cross-linked metallocene compounds may be represented, for instance, by the following general formula (14);

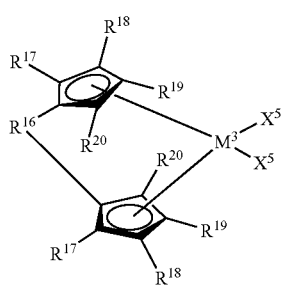

(14)

wherein M$^3$ represents any one metal of Ti, Zr and Hf, R$^{16}$ represents a bivalent aromatic group, a bivalent alicyclic hydrocarbon group, a bivalent aliphatic hydrocarbon group, or a bivalent organic group having a hetero-element such as oxygen, nitrogen, silicon, etc., R$^{17}$-R$^{20}$ independently represent a hydrogen atom or an aliphatic hydrocarbon group having 1-8 carbon atoms, at least one of R$^{17}$-R$^{20}$ being a hydrogen atom, and X$^5$ represents a halogen group, an aliphatic hydrocarbon group 1-8 carbon atoms, or an aromatic hydrocarbon group 6-10 carbon atoms.

Specific examples of the compounds represented by the above formula (14) include, for instance, CH$_2$CH$_2$(methyl-cyclopentadienyl)$_2$ZrBr$_2$, (CH$_3$)$_2$Si(cyclopentadienyl)(dimethylcyclopentadienyl)ZrBr$_2$, (C$_6$H$_5$)$_2$C(ethylcyclopentadienyl)$_2$ZrCl$_2$, CH$_2$CH$_2$CH$_2$(ethylcyclopentadienyl)(trimethylcyclopentadienyl)Zr(CH$_3$)$_2$, CH$_2$CH$_2$(isopropylcyclopentadienyl)$_2$ZrCl$_2$, etc.

The two-cross-linked metallocene compounds may be represented, for instance, by the following general formula (15):

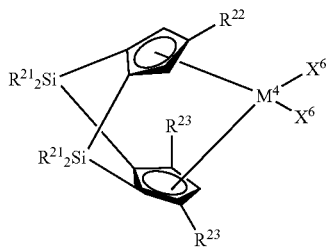

(15)

wherein $R^{21}$-$R^{23}$ independently represent a hydrogen atom or an aliphatic hydrocarbon group having 1-8 carbon atoms, $X^6$ represents a halogen group, an aliphatic hydrocarbon group having 1-8 carbon atoms, or an aromatic hydrocarbon group having 6-10 carbon atoms, $M^4$ represents any one metal of Ti, Zr and High-frequency, and $R^{21}$-$R^{23}$ may be the same or different.

The compounds represented by the above formula (15), which are described, for instance, in J. Am. Chem. Soc., Vol. 121, No. 3, 565(1999), specifically include (1,2-Me$_2$Si)$_2$($\eta^5$-C$_5$H$_3$)$_2$ZrCl$_2$, (1,2-Me$_2$Si)$_2$($\eta^5$-C$_5$H$_3$)($\eta^5$-C$_5$H$_2$-3-CH$_3$)ZrCl$_2$, (1,2-Me$_2$Si)$_2$($\eta^5$-C$_5$H$_3$) [$\eta^5$-C$_5$H$_2$-3-CH(CH$_3$)$_2$]ZrCl$_2$, (1,2-Me$_2$Si)$_2$($\eta^5$-C$_5$H$_3$) [$\eta^5$-C$_5$H-3,5-CH(CH$_3$)$_2$]$_2$ZrCl$_2$, (1,2-Me$_2$Si)$_2$($\eta^5$-C$_5$H$_2$-4-CH$_3$)[$\eta^5$-C$_5$H-3,5-(CH(CH$_3$)$_2$)$_2$]ZrCl$_2$, (1,2-Me$_2$Si)$_2$[$\eta^5$-C$_6$H$_5$-4-CH(CH$_3$)$_3$][$\eta^5$-C$_5$H-3,5-(CH(CH$_3$)$_2$)$_2$]ZrCl$_2$, (1,2-Me$_2$Si)$_2$[$\eta^5$-C$_5$H$_2$-4-Si(CH$_3$)$_3$][$\eta^5$-C$_5$H-3,5-(CH(CH$_3$)$_2$)$_2$]ZrCl$_2$, (1,2-(C$_6$H$_5$)$_2$Si)$_2$[$\eta^5$-C$_5$H$_2$-4-Si(CH$_3$)$_3$][$\eta^5$-C$_5$H-3,5-(CH(CH$_3$)$_2$)$_2$]ZrCl$_2$, (1,2-Me$_2$Si)$_2$[$\eta^5$-C$_5$H$_2$-4-Si(CH$_3$)$_3$][$\eta^5$-C$_5$H-3,5-(CH(CH$_3$)$_2$)$_2$]Zr(CH$_3$)$_2$, (1,2-Me$_2$Si)$_2$($\eta^5$-C$_5$H$_3$)$_2$HfCl$_2$, (1,2-Me$_2$Si)$_2$($\eta^5$-C$_5$H$_3$)($\eta^5$-C$_5$H$_2$-3-CH$_3$)HfCl$_2$, (1,2-Me$_2$Si)$_2$($\eta^5$-C$_5$H$_3$)$_2$TiCl$_2$, (1,2-Me$_2$Si)$_2$($\eta^5$-C$_5$H$_3$)($\eta^5$-C$_5$H$_2$-3-CH$_3$)TiCl$_2$, etc.

The aluminoxanes, boron compounds and organoaluminum compounds in (iii-2) above may be the same as the above catalysts (ii).

The amount of the above metallocene compound (iii-1) is $5.0 \times 10^{-7}$ to $5.0 \times 10^{-3}$ mol, preferably $1.0 \times 10^{-6}$ to $1.0 \times 10^{-4}$ mol, per 1 mol of propylene. The amount of the above compound (iii-2) is $1.0 \times 10^{-5}$ to 5.0 mol, preferably $1.0 \times 10^{-3}$ to 0.1 mol, per 1 mol of propylene. The polymerization reaction is conducted at a temperature of $-100°$ C. to $+90°$ C. for 0.1-100 hours, preferably at a temperature of $-50°$ C. to $+50°$ C. for 1-50 hours.

(d) Catalysts (iv)

When the above catalysts (iv) are used, the above compounds (iv-1) may be represented by the following general formulae (16)-(18):

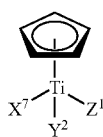

(16)

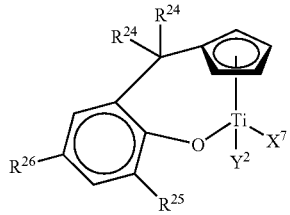

(17)

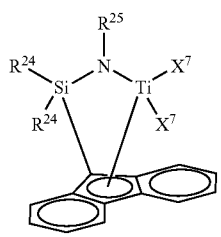

(18)

wherein $X^7$, $Y^2$, $Z^1$ independently represent a halogen group selected from the group consisting of F, Cl, Br and I, an aliphatic hydrocarbon group having 1-8 carbon atoms, an alkoxyl group having 1-8 carbon atoms, an aromatic hydrocarbon group having 6-14 carbon atoms, which may have a substituent group, or an alkoxyl group having 6-14 carbon atoms, and $R^{24}$-$R^{26}$ independently represent an aliphatic hydrocarbon group having 1-8 carbon atoms, or an aromatic hydrocarbon group having 6-14 carbon atoms, which may have a substituent group, $X^7$, $Y^2$, $Z^1$ and $R^{24}$-$R^{26}$ may be the same or different.

The compounds represented by the general formula (16) may be, for instance, CpTi(OMe)$_3$, CpTi(OEt)$_3$, CpTi(O-iPr)$_3$, CpTi(O-tBu)$_3$, CpTi(OC$_6$H$_5$)$_3$, CpTi(2-Me-OC$_6$H$_4$)$_3$, CpTi(2-Et-OC$_6$H$_4$)$_3$, CpTi(2-Pr—OC$_6$H$_4$)$_3$, CpTi(2-tBu-OC$_6$H$_4$)$_3$, CpTi(2,6-Me$_2$-OC$_6$H$_3$)$_3$, CpTi(2,6-Et$_2$-OC$_6$H$_3$)$_3$, CpTi(2,6-iPr$_2$-OC$_6$H$_3$)$_3$, CpTi(2,6-tBu$_2$-OC$_6$H$_3$)$_3$, CpTi(2-Me-6-tBu-OC$_6$H$_3$)$_3$, CpTi(3-Me-6-tBu-OC$_6$H$_3$)$_3$, CpTi(OMe)Cl$_2$, CpTi(OMe)$_2$Cl, CpTi(OC$_6$H$_5$)Cl$_2$, CpTi(OC$_6$H$_5$)$_2$Cl, CpTi(OMe)(OC$_6$H$_5$)Cl, etc. The compounds represented by the general formula (17) may be, for instance, (Me$_2$C)Cp(C$_6$H$_4$)OTiCl$_2$, [(C$_6$H$_5$)$_2$C]Cp(C$_6$H$_4$)OTiCl$_2$, (Me$_2$C)Cp(3-Me-C$_6$H$_3$)OTiCl$_2$, (Me$_2$C)Cp(5-Me-C$_6$H$_3$)OTiCl$_2$, (Me$_2$C)Cp(3-tBu-C$_6$H$_3$)OTiCl$_2$, (Me$_2$C)Cp(3,5-Me$_2$-C$_6$H$_2$)OTiCl$_2$, (Me$_2$C)Cp(3,5-tBu$_2$-C$_6$H$_2$)OTiCl$_2$, (Me$_2$C)Cp(3-Me-5-tBu-C$_6$H$_2$)OTiCl$_2$, (Me$_2$C)Cp(3-tBu-5-Me-C$_6$H$_2$)OTiCl$_2$, etc. The compounds represented by the general formula (18) may be, for instance, MeNSiMe$_2$(Flu)TiCl$_2$, tBuNSiMe$_2$(Flu)TiCl$_2$, C$_6$H$_5$NSiMe$_2$(Flu)TiCl$_2$, tBuNSi(C$_6$H$_5$)$_2$(Flu)TiCl$_2$, tBuNSiMe$_2$(Flu)TiMe$_2$, etc.

The aluminoxanes, boron compounds and organoaluminum compounds in (iv-2) above may be the same as the above catalysts (ii).

The amount of the compound (iv-1) is $1 \times 10^{-8}$ to 0.1 mol, preferably $1 \times 10^{-7}$ to $5 \times 10^{-2}$ mol, per 1 mol of propylene. The amount of the above compound (iv-2) is $1 \times 10^{-8}$ to 0.1 mol, preferably $1 \times 10^{-7}$ to 0.05 mol, per 1 mol of propylene. The polymerization reaction may be conducted at a temperature of $-100°$ C. to $+90°$ C. for 0.5-100 hours, preferably at a temperature of $-50°$ C. to $+50°$ C. for 1-50 hours.

(e) Catalysts (v)

When the above catalysts (v) are used, the diimine complexes may be compounds represented, for instance, by the following general formulae (19)-(22):

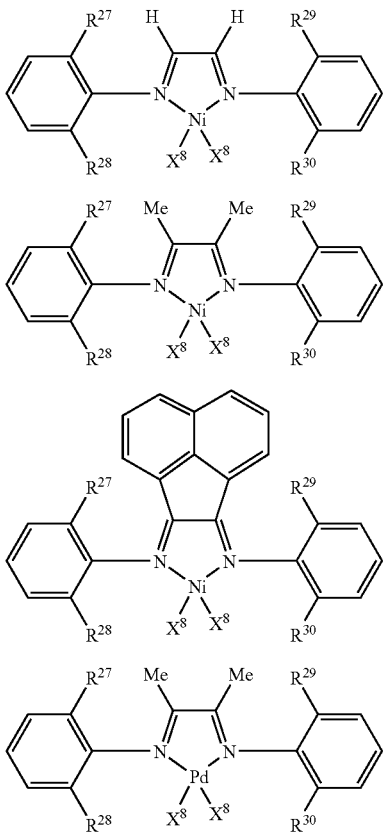

(19)

(20)

(21)

(22)

wherein $X^8$ represents Cl or a methyl (Me) group, and $R^{27}$-$R^{30}$ independently represent a methyl (Me) group or an isopropyl (iPr) group, which may be the same or different. The aluminoxanes may be the same as the above catalysts (ii).

The amount of the diimine complex of nickel, palladium, etc. is $1\times10^{-6}$ to 0.1 mol, preferably $5\times10^{-6}$ to $5\times10^{-2}$ mol, per 1 mol of propylene. the amount of the aluminoxane is $1\times10^{-6}$ to 0.1 mol, preferably $5\times10^{-4}$ to 0.05 mol, per 1 mol of propylene. The polymerization reaction may be conducted at a temperature of $-100°$ C. to $+90°$ C. for 0.5-100 hours, preferably at a temperature of $-50°$ C. to $+50°$ C. for 1-50 hours.

(f) Catalysts (vi)

When the above catalysts (vi) are used, the titanium diamide complexes may be compounds represented by the following formula (23):

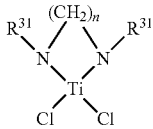

(23)

wherein $R^{31}$ represents a hydrocarbon group, and n represents an integer of 1-10. In the above formula (23), $R^{31}$ is preferably an aromatic group with or without an alkyl group, specifically, a dipropylphenyl group. In the above formula (23), n is preferably an integer of 2-5.

(g) Catalysts (vii)

When the above catalysts (vii) are used, the phenoxyimine complexes of titanium, zirconium, hafnium, etc. may be represented, for instance, by the following general formula (24):

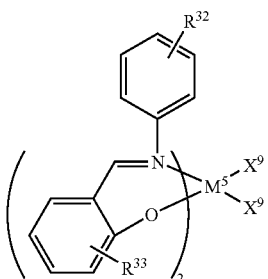

(24)

wherein $M^5$ represents any one metal of Ti, Zr and Hf, $R^{32}$ and $R^{33}$ independently represent an alkyl group having 1-5 carbon atoms, and $X^9$ represents F, Cl, Br or I. The aluminoxanes may be the same as the above catalysts (ii).

The polymerization reaction may be conducted at a temperature of 0-200° C. for 0.5-100 hours, preferably at a temperature of 50-150° C. for 1-50 hours. The reaction solvents may be the above saturated aliphatic hydrocarbons, the above saturated alicyclic hydrocarbons, the above aromatic hydrocarbons, etc. The amount of the phenoxyimine complex of titanium, zirconium, hafnium, etc. is $1\times10^{-5}$ to 0.1 mol, preferably $5\times10^{-6}$ to $5\times10^{-2}$ mol, per 1 mol of propylene. The amount of the aluminoxane is $1\times10^{-6}$ to 0.1 mol, preferably $5\times10^{-4}$ to 0.05 mol, per 1 mol of propylene.

(h) Catalysts (viii)

When the above catalysts (viii) are used, the pyrrole-imine complexes of titanium, etc. may be represented, for instance, by the following general formula (25):

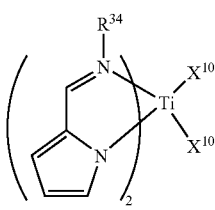

(25)

wherein $X^{10}$ represents F, Cl, Br or I, and $R^{34}$ represents an alkyl or phenyl group having 1-5 carbon atoms. The aluminoxanes may be the same as the above catalysts (ii).

The amount of the pyrrole-imine complex of titanium, etc. is $1\times10^{-6}$ to 0.1 mol, preferably $5\times10^{-6}$ to $5\times10^{-2}$ mol. The amount of the aluminoxane is $1\times10^{-6}$ to 0.1 mol, preferably $5\times10^{-4}$ to 0.05 mol, per 1 mol of propylene. The polymerization reaction may be conducted at a temperature of 0-200° C. for 0.5-100 hours, preferably at a temperature of 50-150° C. for 1-50 hours.

Among the above catalysts (i)-(viii), the catalysts (i)-(iii) are preferable, and the catalysts (i) are more preferably. Whichever catalyst (i)-(viii) is used, hydrogen, diethyl zinc, a compound containing a Si—H bond, etc. may be added as a molecular-weight-controlling agent. The catalysts (i)-(viii) may be supported by carriers such as silica, alumina, zirconia, titania, etc.

From polypropylene produced by the metal complex catalyst, a crystalline polypropylene by-product should be removed. The removal of the by-produced crystalline polypropylene may be carried out, for instance, by a method of removing an undissolved portion by filtration, centrifugal separation, etc. using a solvent in which amorphous polypropylene is soluble, but crystalline polypropylene is insoluble.

(B) Non-Uniform Metal Complex Catalysts

The non-uniform metal complex catalysts may comprise (a) at least one selected from the group consisting of titanium compounds, zirconium compounds and hafnium compounds, (b) at least one selected from the group consisting of magnesium compounds, manganese compounds and cobalt compounds, and (c) an organoaluminum compound.

The above compounds (a) as ligands include halogen groups, alkoxyl groups and their derivatives, a cyclopentadienyl group and its derivatives, acetylacetone and its derivatives, etc. The number of ligands is preferably 2-4, more preferably 4. For instance, the titanium compounds may be represented by the following formula (26):

$$TiX^{11}{}_b(OR)_cCp_d(acac)_e \qquad (26),$$

wherein $X^{11}$ represents a halogen group, OR represents an alkoxyl group, Cp represents a cyclopentadienyl group, acac represents an acetylacetone, and each of b, c, d and e is an integer of 0-4 meeting b+c+d+e=4. The compounds represented by the above formula (26) include $TiCl_4$, $Ti(OBu)_4$, $Cp_2TiCl_2$, $(acac)_2TiCl_2$, etc.

The above compounds (b) as ligands include halogen groups alkyl groups and their derivatives, alkoxyl groups and their derivatives, etc. For instance, the magnesium compounds may be represented by the following formula (27):

$$MgX^{12}{}_fR^{35}{}_g(OR)_h \qquad (27),$$

wherein $X^{12}$ represents a halogen group, $R^{35}$ represents an alkyl group, OR represents an alkoxyl group, and each of f, g and h is an integer of 0-2 meeting f+g+h=2.

The above organoaluminum compounds (c) include, for instance, alkyl aluminum halides such as dimethylaluminum chloride, diethylaluminum chloride, diethylaluminum iodide, diisobutylaluminum chloride, ethylaluminum sesquichloride, ethylaluminum dichloride, isobutylaluminum dichloride, etc.; methylaluminoxanes, etc.

Particularly preferable non-uniform metal complex catalysts are those developed for synthesizing low-crystallinity polypropylene and ethylene-propylene copolymers.

When the non-uniform metal complex catalysts are used, too, hydrogen, diethyl zinc, a compound containing a Si—H bond, etc. may be added as a molecular-weight-controlling agent. The non-uniform metal complex catalysts may be supported by carriers such as silica, alumina, zirconia, titania, etc. The methods of applying the non-uniform catalysts to carriers are described in JP7-121970B, JP7-121971B, JP7-121972B, JP62-295909A, JP63-54407A, JP63-54408A, etc.

The non-uniform metal complex catalysts may contain electron-donor compounds, which are described in JP7-121970B. Specifically, the electron-donor compounds may be esters, ketones, ethers, silicon compounds, etc. Among them, ethers are preferable. Usable ethers are described in JP1-236203A, JP3-294308A, etc. As described above, crystalline polypropylene by-products should be removed from polypropylene produced by using the metal complex catalyst.

(3) Modifying Treatment

The polypropylene may be modified by methods described below, to improve adhesion to electrodes. Modifying agents usable are preferably compounds represented by the following general formula (1):

wherein $R^1$ represents a hydrogen atom, or an alkyl group having 1-10 carbon atoms; $R^2$ represents an $OR^4$ group [$R^4$ represents a hydrogen atom, an alkyl group having 1-10 carbon atoms, which may have a halogen group, an aromatic group which may have an alkyl group, a —$(CH_2)_a$—O—P(O)(OR$^1$)$_2$ group, a —$(CH_2)_a$—O—P(O)(O$^-$)(O—$(CH_2)_b$—N$^+$R$^1$$_3$) group, wherein a and b are respectively integers of 1-5, an alkali metal selected from the group consisting of Li, Na and K, an alicyclic hydrocarbon group having 5-10 carbon atoms, a glycidyl group, an —$R^5$—COCR$^1$=CH$_2$ group, wherein $R^5$ represents an alkylene group having 1-10 carbon atoms or a —[(CH$_2$)$_q$—O—]$_r$— group, wherein q and r are respectively integers of 1-5, an —$R^5$OR$^1$ group, an —$R^5$Si(OR$^1$)$_3$ group, or an —$R^5$—NCO group], an —NR$^1$$_2$ group, —$R^5$—NR$^1$$_2$ group, or a halogen group selected from the group consisting of Cl, Br, F and I; and $R^3$ represents a hydrogen atom, or a —COR$^2$ group, and compounds represented by the following general formula (2):

wherein $R^6$ represents a hydrogen atom or an alkyl group having 1-10 carbon atoms, or a halogen group selected from the group consisting of Cl, Br, F and I; $R^7$ represents an —Ar—X' group (X' represents an $R^6$ group, an —OH group, a —COOH group, an —NH$_2$ group, a —CN group, an —NO$_2$ group, a halogenated alkyl group having 1-10 carbon atoms, a —CH=CH$_2$ group, or an —OCO—R$^6$ group), an —OCO—R$^6$ group, a —CHO group, a —COR$^6$ group, a —CN group, a pyridyl group, a pyrrolidonyl group, an —Si(OR$^1$)$_3$ group ($R^1$ represents hydrogen atom, or an alkyl group having 1-10 carbon atoms), a halogenated alkyl group having 1-10 carbon atoms, a halogen group, an —OR$^6$ group, an —OSO$_3$M group (M represents an alkali metal selected from the group consisting of Li, Na and K), or —NH—CO—R$^6$ group.

The modifying agents represented by the general formula (1) include (meth)acrylic acid; alkyl esters such as methyl acrylate, ethyl acrylate, n-butyl acrylate, isobutyl acrylate, t-butyl acrylate, cyclohexyl acrylate, 2-ethylhexyl acrylate, n-octyl acrylate, triphenylmethyl acrylate, methyl methacrylate, ethyl methacrylate, n-butyl methacrylate, isobutyl methacrylate, t-butyl methacrylate, cyclohexyl methacrylate, 2-ethylhexyl methacrylate, n-octyl methacrylate, triphenylmethyl methacrylate, etc.; glycidyl esters such as glycidyl acrylate, glycidyl methacrylate, etc.; alkali metal salts of (meth)acrylic acid such as sodium acrylate, potassium acrylate, lithium acrylate, sodium methacrylate, potassium methacrylate, lithium methacrylate, etc.; halogenated (meth) acrylic acids such as acryloyl chloride, acryloyl bromide, α-chloromethyl acrylate, methylacryloyl chloride, methylacryloyl bromide, α-chloromethyl methacrylate, etc.; amino-group-containing (meth)acrylic acid derivatives such as acrylamide, N,N-dimethylacrylamide, N,N-diisopropylacrylamide, methacrylamide, N,N-dimethylmethacrylamide, N,N-diisopropylmethacrylamide, N,N-dimethylaminoethylacrylate, N,N-dimethylaminoethylmethacrylate, etc.; di(meth) acrylate such as ethylene glycol diacrylate, diethylene glycol diacrylate, dipropylene glycol diacrylate, 1,4-butanediol diacrylate, 1,6-hexanediol diacrylate, ethylene glycol dimethacrylate, dipropylene glycol dimethacrylate, 1,4-butanediol dimethacrylate, 1,6-hexanediol dimethacrylate, etc.; (meth)acrylic acid derivatives containing a hydroxyl or alkoxyl group such as 2-hydroxyethylacrylate, 3-hydroxypropylacrylate, 4-hydroxybutylacrylate, trimethoxysilylpropyl acrylate, 2-methoxyethylacrylate, 2-hydroxyethylmethacrylate, 3-hydroxypropyl methacrylate, 4-hydroxybutylmethacrylate, 2-methoxyethylmethacrylate, trimethoxysilyl propyl methacrylate, etc.; isocyanate-group-containing (meth)acrylic acid derivatives such as 2-isocyanate ethyl acrylate, 2-isocyanate ethyl methacrylate, etc.; phosphor-containing (meth)acrylic acid derivatives such as ethylene glycol methacrylate phosphate, 2-methacryloyloxy ethyl phosphorylcholine, $CH_2=C(CH_3)CO—O—CH_2—CH_2(CH_2Cl)—O—PO(OH)_2$, $CH_2=C(CH_3)CO—O—CH_2—CH_2—O—PO(OH)—O—NH_3(CH_2CH_2OH)$, etc.

Particularly preferable as the compound represented by the general formula (1) is at least one selected from the group consisting of (meth)acrylic acid and its alkyl esters, glycidyl esters, alkali metal salts of (meth)acrylic acid and their halides, and (meth)acrylic acid derivatives containing any one of a hydroxyl group, an alkoxyl group, an amino group and an isocyanate group.

The compounds represented by the general formula (2) include nitrile compounds such as acrylonitrile, methacrylonitrile, etc.; vinyl compounds such as vinyl chloride, vinyl bromide, vinyl fluoride, vinyl iodide, vinylidene chloride, sodium vinyl sulfonate, potassium vinyl sulfonate, lithium vinyl sulfonate, methyl vinyl ether, ethyl vinyl ether, isobutyl vinyl ether, vinyl pyridine, N-vinyl pyridine, vinyl pyrrolidone, acrolein, methyl vinyl ketone, isobutyl vinyl ketone, vinyl acetate, vinyl propionate, vinyl butyrate, vinyl trimethylsilane, vinyl triethoxysilane, vinyl acetamide, N-vinyl acetamide, ally chloride, etc.; styrene derivatives such as styrene, hydroxystyrene, aminostyrene, divinyl benzene, vinyl benzoate, cyanostyrene, nitrostyrene, chloromethylstyrene, α-methylstyrene, p-methylstyrene, acetoxystyrene, p-dimethylamino methylstyrene, etc.; unsaturated dicarboxylic acids such as maleic acid, citraconic acid, dimethyl maleate, diethyl maleate, etc. Among them, styrene derivatives, vinyl compounds and unsaturated dicarboxylic acids are preferable.

To modify polypropylene, it is reacted with the above modifying agent in the presence of a radical initiator. The modification is conducted preferably in an organic solvent. A blender is preferably used for the modification. The modification may be carried out in a nitrogen atmosphere, if necessary.

The organic solvents may be saturated aliphatic hydrocarbons such as propane, butane, pentane, hexane, heptane, octane, nonane, decane, dodecane, etc.; saturated alicyclic hydrocarbons such as cyclopropane, cyclohexane, etc.; aromatic hydrocarbons such as benzene, toluene, xylene, etc.

The radical initiators may be azo compounds such as azobisisobutylonitrile, 2,2-azobis(2,4-dimethylvaleronitrile), etc.; peroxides such as benzoyl peroxide, t-butylperoxy-2-ethylhexanoate, 2,5-dimethyl-2,5-di-t-butylperoxyhexane, etc.

Although one modifying agent is usually used, two or more modifying agents may be used. When two or more modifying agents are used, they may be mixed before reaction with polypropylene, but they may be added in two or more stages to be reacted with polypropylene.

The modification reaction is conducted at a temperature of 50-200° C., preferably 60-160° C. The reaction time is 0.5 hours or longer, preferably 1-10 hours. The longer the reaction time, the more modifying agent is introduced into the polypropylene. The amount of the modifying agent introduced into the polypropylene is 1-500, more preferably 1-400, particularly 1-300, by the number of molecules per one polypropylene molecule.

In the modified polypropylene obtained by the above method, the modifying agent is grafted to the polypropylene skeleton. When the modifying agent is grafted at two or more points, the modifying agent randomly introduced into the skeleton provides the polypropylene with a pendant structure.

(4) Cross-Linking Treatment

The polypropylene may be cross-linked, so that the microporous composite membrane becomes resistant to deformation when it is swelled at high temperatures by absorbing an electrolytic solution. The cross-linking may be conducted by the irradiation of ionizing radiations, the use of cross-linking agents, vulcanization, etc. The ionizing radiations may be α-rays, β-rays, γ-rays, electron beams, etc. The cross-linking agents may be compounds having two or more unsaturated bonds such as butadiene, isoprene, etc.

(5) Additional Polymers

Polymers other than the above polypropylene may be added to the coating layer unless the effects of the present invention are deteriorated. The other additional polymer is at least one selected from the group consisting of fluororesins, polyimides, polyether-ether-ketone, polyamides, polyether sulfones, polyetherimides, polysulfones and polyarylene sulfides.

The fluororesin is preferably at least one selected from the group consisting of polyvinylidene fluoride, polyvinyl fluoride, vinylidene fluoride copolymers and vinyl fluoride copolymers. The amount of a vinylidene fluoride unit in the vinylidene fluoride copolymers, and the amount of a vinyl fluoride unit in the vinyl fluoride copolymers are respectively preferably 75% by mass or more, more preferably 90% by mass or more. Examples of monomers copolymerized with vinylidene fluoride or vinyl fluoride include hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl butyrate, acrylic acid and its salts, methyl methacrylate, ally methacrylate, acrylonitrile, methacrylonitrile, N-butoxymethyl acrylamide, ally acetate, isopropenyl acetate, etc. Among them, polyvinylidene fluoride and vinylidene fluoride copolymers are preferable. The vinylidene fluoride copolymers are preferably hexafluoropropylene-vinylidene fluoride copolymers.

The preferred polyarylene sulfide is polyphenylene sulfide. The above other polymers may be cross-linked by the method described in (4) above. The above other polymers may be modified by graft polymerization. Compounds usable for graft polymerization may be those described in (3) above. The amount of the other polymer added to the polypropylene is preferably 20% by mass or less per 100% by mass of the resin forming the coating layer.

[3] Production Method of Microporous Composite Membrane

The microporous composite membrane of the present invention may be produced by (a) applying a mixed liquid containing the polypropylene and its good solvent to at least one surface of the microporous polyolefin membrane, removing the good solvent to increase the concentration of the polypropylene, thereby providing a structure in which the polypropylene phase is separated from the good solvent phase, and then removing the remainder of the good solvent; (b) applying the mixed liquid to at least one surface of the microporous polyolefin membrane, cooling the resultant coating layer to provide a structure in which the polypropylene phase is separated from the good solvent phase, and removing the good solvent; (c) applying the mixed liquid to at least one surface of the microporous polyolefin membrane, bringing the resultant coating layer into contact with poor solvent for the polypropylene, selectively evaporating the good solvent to provide the coating layer with a structure in which the polypropylene phase is separated from the poor solvent phase, and then removing the poor solvent; or (d) applying a mixed liquid containing the polypropylene, the good solvent and the poor solvent to at least one surface of the microporous polyolefin membrane, selectively removing the good solvent to provide the resultant coating layer with a structure in which the polypropylene phase is separated from the poor solvent phase, and then removing the poor solvent.

The good solvents may be toluene, xylene, tetrahydrofuran (THF), hexane, heptane, etc., and the poor solvents may be methanol, ethanol, isopropyl alcohol, acetone, methylethylketone, etc. In the above method (d), though a ratio of the good solvent to the poor solvent is not particularly restricted, it is preferably 10/90-99/1, more preferably 20/80-80/20, by mass.

In any of the above methods (a)-(d), the concentration of polypropylene in each mixed liquid to be applied (simply called "coating liquid" unless otherwise mentioned) is 0.5-10% by mass. When the concentration of polypropylene in the coating liquid is less than 0.5% by mass, a sufficient amount of polypropylene cannot be applied by one coating operation, undesirably resulting in repeated coating operations that reduce production efficiency. On the other hand, when the concentration of polypropylene in the coating liquid is more than 10% by mass, too much polypropylene is coated, resulting in a non-uniform coating layer and deteriorated air permeability.

The coating liquid may contain various additives such as anti-oxidants, ultraviolet absorbers, antiblocking agents, pigments, dyes, inorganic fillers, etc., if necessary, in a range not loosing the effects of the present invention.

The coating method may be well-known casting or coating methods, such as a dip coater method, a roll coater method, an air-knife coater method, a blade coater method, a rod coater method, a bar coater method, a comma coater method, a gravure coater method, a silk screen method, a die coater method, a microgravure coater method, etc.

The removal of a good solvent and a poor solvent after the coating of the mixed solution, may be well-known methods such as air-drying, hot-air-drying, heating in an oven, etc. Vacuum drying may be conducted, if necessary. The air-drying is preferably followed by heat drying. The air-drying method may be, for instance, a method of blowing a low-moisture gas. The heat-drying temperature is preferably the crystal dispersion temperature of polyethylene or lower. The crystal dispersion temperature of polyethylene is generally 90° C. The heat-drying temperature is preferably in a range of 50-90° C., and the heat-drying time is preferably in a range of 1-90 minutes, though not particularly restricted.

In the above method (a), the removal of part of the good solvent to increase the concentration of polypropylene in the coating layer causes microphase separation to a polypropylene phase and a good solvent phase, and further removal of the remainder of the good solvent fixes the resultant phase separation, thereby forming fine pores. To obtain a structure in which the polypropylene phase and the good solvent phase are well separated microscopically, the mixed liquid applied to the microporous polyolefin membrane is preferably air-dried at about room temperature, and then heat-dried.

In the above methods (c) and (d), a microphase separation to the resin phase and the poor solvent phase is fixed by removing the poor solvent, thereby forming fine pores. Accordingly, the good solvent evaporates earlier than the poor solvent in the drying step. Thus, the boiling point of the good solvent is preferably equal to or lower than that of the poor solvent, more preferably low than the latter. The good solvent is preferably not azeotropic with the poor solvent.

The amount of the coating layer formed is controlled, such that the resultant microporous composite membrane has air permeability (converted to the value at 25-µm thickness) of 50-10,000 seconds/100 cc, preferably 100-3,000 seconds/100 cc. Though varying depending on the average penetrating pore diameter (average diameter of penetrating cylindrical pores) and porosity of the microporous polyolefin membrane, the amount of the coating layer formed is preferably 0.1-5 g, more preferably 0.5-3 g, per 1 $m^2$ of the microporous polyolefin membrane on a solid basis. When the amount of the coating layer is less than 0.1 $g/m^2$, the coating layer has insufficient high-temperature storability. On the other hand, when it exceeds 5 $g/m^2$, the permeability of the coating layer is likely to deteriorate.

The average penetrating pore diameter of the coating layer is also controlled, such that the microporous composite membrane has air permeability (converted to the value at 25-µm thickness) within the above range. The pore diameters of the coating layer can be controlled by properly selecting the concentration of polypropylene in the mixed liquid, the types of the good solvent and the poor solvent, a coating method, a drying speed, etc. The average penetrating pore diameter of the coating layer is preferably equal to or more than that of the microporous polyolefin membrane, to provide the microporous membrane with improved meltdown properties and high-temperature storability without drastically reducing permeability.

The coating layer may be formed on one or both surfaces of the microporous polyolefin membrane. When the coating layer is formed on only one surface of the microporous polyolefin membrane, the coating layer side of the microporous composite membrane is brought into contact with a cathode in a battery.

[4] Microporous Composite Membrane

The microporous composite membranes according to preferred embodiments of the present invention have the following properties.

(1) Porosity of 25-95%, preferably 30-90%, more preferably 35-85%. When the porosity is less than 25%, good air permeability cannot be obtained. On the other hand, when the porosity exceeds 95%, good balance is not achieved between battery safety and impedance.

(2) Air permeability (converted to the value at 25-µm thickness) of 50-10,000 seconds/100 cc, preferably 100-3,000 seconds/100 cc. The air permeability of 50-10,000 seconds/100 cc provides batteries with large capacity and thus good cyclability. When the air permeability exceeds 10,000 seconds/100 cc, battery separators formed by the microporous composite membrane provides small battery capacity. On the other hand, when it is less than 50 seconds/100 cc, there is a low shutdown speed when temperatures are elevated inside the battery, resulting in low safety.

(3) Pin puncture strength of 5,000 mN/25 μm or more. When the pin puncture strength is less than 5,000 mN/25 μm, short-circuiting is likely to occur in a battery having a separator formed by the microporous composite membrane.

(4) Shutdown temperature of 120-140° C.

(5) Meltdown temperature of 155° C. or higher.

(6) Battery capacity recovery ratio [(battery capacity after storing/initial battery capacity)×100] of 70% or more after storing at 80° C. for 30 days, when assembled in a lithium secondary battery.

Because the microporous composite membrane of the present invention has well-balanced permeability, mechanical strength, shutdown properties, meltdown properties and high-temperature storability as described above, it is suitable for battery separators, filters, etc. The thickness of the microporous composite membrane may be properly selected depending on applications, and it is preferably 10-200 μm when used, for instance, as battery separators.

[5] Battery

The microporous composite membrane of the present invention may be used as separators for secondary batteries such as nickel-hydrogen batteries, nickel-cadmium batteries, nickel-zinc batteries, silver-zinc batteries, lithium secondary batteries, lithium polymers secondary batteries, etc., particularly preferable as separators for lithium secondary batteries. Taking the lithium secondary battery for example, explanation will be made below.

The lithium secondary battery comprises a cathode and an anode laminated via a separator, and the separator contains an electrolytic solution (electrolyte). The electrode may have a known structure, not particularly restricted. The electrode structure may be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises (a) a current collector, and (b) a cathodic active material layer capable of absorbing and discharging lithium ions, which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on α-NaFeO$_2$, etc. The anode comprises (a) a current collector, and (b) an anodic active material layer formed on the current collector. The anodic active materials may be carbonaceous materials such as natural graphite, artificial graphite, cokes, carbon black, etc.

The electrolytic solutions are obtained by dissolving lithium salts in organic solvents. The lithium salts may be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts may be used alone or in combination. The organic solvents may be organic solvents having high boiling points and high dielectric constants such as ethylene carbonate, propylene carbonate, ethylmethyl carbonate, γ-butyrolactone, etc., tetrahydrofuran; organic solvents having low boiling points and low viscosity such as 2-methyltetrahydrofuran, dimethoxyethane, dioxolane, dimethyl carbonate, diethyl carbonate, etc. These organic solvents may be used alone or in combination. Because the organic solvents having high dielectric constants have high viscosity, while those having low viscosity have low dielectric constants, their mixtures are preferably used.

When the battery is assembled, the separator is impregnated with the electrolytic solution, so that the separator (microporous membrane) is provided with ion permeability. The impregnation treatment is usually conducted by immersing the microporous membrane in the electrolytic solution at room temperature. When a cylindrical battery is assembled, for instance, a cathode sheet, a separator formed by the microporous composite membrane and an anode sheet are laminated in this order, and the resultant laminate is wound to a toroidal-type electrode assembly. The resultant electrode assembly is charged into a battery can and then impregnated with the above electrolytic solution, and a battery lid acting as a cathode terminal provided with a safety valve is caulked to the battery can via a gasket to produce a battery.

The present invention will be explained in more detail referring to Examples below without intention of restricting the scope of the present invention.

EXAMPLE 1

(1) Preparation of Microporous Polyethylene Membrane 100 parts by mass of a composition (Mw/Mn: 16.8, melting point: 135° C., crystal dispersion temperature: 90° C.) comprising 30% by mass of ultra-high-molecular-weight polyethylene (UHMWPE) having Mw of 2.0×10$^6$ and 70% by mass of high-density polyethylene (HDPE) having Mw of 3.5×10$^5$ was mixed with 0.375 parts by mass of tetrakis[methylene-3-(3,5-ditertiary-butyl-4-hydroxyphenyl)-propionate]methane, an anti-oxidant, to prepare a polyethylene composition. 30 parts by mass of the polyethylene composition was supplied to a strong-kneading, double-screw extruder (internal diameter=58 mm, L/D=42), and 70 parts by mass of liquid paraffin was introduced into the double-screw extruder through its side-feeder. The resultant mixture was melt-blended at 210° C. and 200 rpm in the extruder to prepare a polyethylene solution. Subsequently, this polyethylene solution was extruded through a T-die installed at a tip end of the extruder such that a biaxially stretched membrane became as thick as about 25 μm, and drawn by a cooling roll controlled at 40° C., to form a gel-like molding. The resultant gel-like molding was biaxially stretched to 5×5 times by a continuous stretching machine at 112° C. to form a stretched membrane. Set in an aluminum frame of 20 cm×20 cm, the membrane was immersed in methylene chloride in a washing bath controlled to 25° C., and washed with vibration at 100 rpm for 3 minutes. The washed membrane was air-dried at room temperature, and heat-set at a temperature of 125° C. for 10 minutes while being held by a tenter to produce a microporous polyethylene membrane. The properties of the microporous polyethylene membrane are shown in Table 1.

(2) Preparation of Polypropylene 100 ml of a solution of diethylaluminum chloride in toluene (concentration: 2 mol/L), and 150 ml of toluene were charged into a stirrer-equipped, four-neck flask filled with nitrogen, and 8.3 mol of propylene was introduced and cooled to −80° C. while stirring. While keeping at −80° C., 20 ml of a solution of tris(2-methyl-1,3-butanedionato) vanadium in toluene (concentration: 0.1 mol/L) was added to start polymerization. After the polymerization for 15 hours, stirring was stopped, and the reaction liquid was poured into 2 L of an ethanol-hydrochloric acid solution cooled to −78° C. The resultant rude polymer was washed with 1 L of ethanol five times, and then vacuum-dried at room temperature to obtain 27 g of polypropylene. The Mw, molecular weight distribution (Mw/Mn), solubility in toluene [g/100 g (25° C.)], and racemic diad fraction [r] of the polypropylene are shown in Table 1.

(3) Formation of Coating Layer

Toluene was added to the polypropylene obtained in the step (2) above, and stirred at room temperature for 12 hours to prepare a solution with a solid concentration of 2% by mass. The resultant solution of polypropylene in toluene was applied to the microporous polyethylene membrane produced in the step (1) above at room temperature by a dip-coater method. The resultant coating layer was air-dried at room temperature for 24 hours, and then dried at a temperature of 80° C. for 1 hour to produce a microporous composite membrane. The amount of polypropylene coated is shown in Table 1.

(4) Production of Lithium Secondary Battery

FIG. 1 is a cross-sectional view showing the structure of the coin-shaped lithium secondary battery produced. Referring to FIG. 1, the production processes of the lithium secondary battery will be explained.

(a) Production of Cathode 87 parts by mass of composite lithium-cobalt oxide ($LiCoO_2$), 10 parts by mass of flake graphite, and 3 parts by mass of polyvinylidene fluoride (PVDF) were added to N-methyl-2-pyrrolidone, and fully mixed by stirring for 1 hour to prepare a cathodic active material paste.

The cathodic active material was applied to an aluminum foil current collector 1a by a doctor blade method to form a uniform-thickness layer, which was dried to a cathodic active material layer 1b. The resultant laminate was punched to a 14-mm-diameter circle, to obtain a cathode 1 comprising the cathodic active material layer 1b formed on the current collector 1.

(b) Production of Anode 95 parts by mass of mesophase carbon microbeads and 5 parts by mass of polyvinylidene fluoride (PVDF) were added to N-methyl-2-pyrrolidone, and fully mixed to prepare an anodic active material paste. The anodic active material was applied to a copper foil current collector 2a by a doctor blade method to form a uniform-thickness layer, which was dried to obtain an anodic active material layer 2b. The resultant laminate was punched to a 14-mm-diameter circle to obtain an anode 2 comprising the anodic active material layer 2b formed on the current collector 2a.

(c) Preparation of Electrolytic Solution

Ethylene carbonate (EC) and diethyl carbonate (DEC) were mixed at an EC/DEC volume ratio of 30/70 to prepare an organic solvent. 1 mol/liter of $LiPF_6$ was added to this organic solvent to prepare an electrolytic solution 3.

(d) Assembling of Battery

The cathode 1 and the anode 2 were heated at a temperature of 150° C. under reduced pressure, to substantially completely remove moisture and N-methyl-2-pyrrolidone from the electrodes. The dried cathode 1 and the dried anode 2 were respectively welded to a cathode casing 11 and an anode casing 12, such that they sandwiched the separator 4 formed by the microporous composite membrane produced in the above step (3). After pouring the electrolytic solution 3, the gasket 5 was sealed to provide a coin-shaped lithium secondary battery.

EXAMPLE 2

A microporous composite membrane was produced in the same manner as in Example 1 except for changing the concentration of the polypropylene solution in toluene to 5% by mass. The amount of polypropylene coated is shown in Table 1. Using the microporous composite membrane, a lithium secondary battery was produced in the same manner as in Example 1.

EXAMPLE 3

A microporous composite membrane was produced in the same manner as in Example 1 except for changing the concentration of the polypropylene solution in toluene to 8% by mass. The amount of polypropylene coated is shown in Table 1. Using the microporous composite membrane, a lithium secondary battery was produced in the same manner as in Example 1.

EXAMPLE 4

(1) Production of Microporous Polyethylene Membrane

A microporous polyethylene membrane was produced in the same manner as in Example 1.

(2) Preparation of Polypropylene 25 ml of a solution of ethylaluminum dibromide in toluene (concentration: 2 mol/L), and 150 ml of toluene were charged into a stirrer-equipped, four-neck flask filled with nitrogen, and 8.3 mol of propylene was introduced, and cooled to −55° C. while stirring. While keeping at −55° C., 50 ml of a solution of $VCl_4$ in toluene (concentration: 0.1 mol/L) was added to start polymerization. After the polymerization was conducted for 15 hours, stirring was stopped, and the reaction liquid was poured into 2 L of an ethanol-hydrochloric acid solution cooled to −78° C. The resultant rude polymer was washed with 1 L of ethanol 5 times, and then vacuum-dried at room temperature to obtain 9.7 g of polypropylene. The Mw, Mw/Mn, solubility in toluene [g/100 g (25° C.)] and racemic diad fraction [r] of the polypropylene are shown in Table 1.

(3) Formation of Coating Layer

A microporous composite membrane was produced by forming a coating layer in the same manner as in Example 1, except that toluene was added to the polypropylene obtained in the above step (2), and stirred at room temperature for 12 hours to prepare a 5-%-by-mass solution. The amount of polypropylene coated is shown in Table 1.

(4) Production of Lithium Secondary Battery

Using the microporous composite membrane obtained in the above step (3), a lithium secondary battery was produced in the same manner as in Example 1.

EXAMPLE 5

(1) Production of Microporous Polyethylene Membrane

A microporous polyethylene membrane was produced in the same manner as in Example 1.

(2) Preparation of Polypropylene 25 ml of a solution of diisobutylaluminum chloride in toluene (concentration: 2 mol/L), and 150 ml of toluene were charged into a stirrer-equipped, four-neck flask filled with nitrogen, and 8.3 mol of propylene was introduced, and cooled to −78° C. while stirring. While keeping at −78° C., 50 ml of a solution of $V(acetylacetonato)_3$ in toluene (concentration: 0.1 mol/L) was added to start polymerization. After the polymerization was conducted for 24 hours, stirring was stopped, and the reaction liquid was poured into 2 L of an ethanol-hydrochloric acid solution cooled to −78° C. The resultant rude polymer was washed with 1 L of ethanol 5 times, and then vacuum-dried at room temperature to obtain 15 g of polypropylene. The Mw, Mw/Mn, solubility in toluene [g/100 g (25° C.)] and racemic diad fraction [r] of the polypropylene are shown in Table 1.

(3) Formation of Coating Layer

Using the polypropylene obtained in the above step (2), a microporous composite membrane was produced by forming a coating layer in the same manner as in Example 1. The amount of polypropylene coated is shown in Table 1.

(4) Production of Lithium Secondary Battery

Using the microporous composite membrane obtained in the above step (3), a lithium secondary battery was produced in the same manner as in Example 1.

EXAMPLE 6

(1) Production of Microporous Polyethylene Membrane

A microporous polyethylene membrane was produced in the same manner as in Example 1.

(2) Preparation of Polypropylene 150 ml of toluene was charged into a 2-L, stirrer-equipped autoclave filled with nitrogen, and kept at a temperature of 21° C. At that temperature, 90 mmol of ethylaluminum sesquichloride was added. 3 ml of a solution of Ti(OBu)$_4$ in toluene (concentration: 1 mol/L) was added, and 8.3 mol of propylene was introduced while stirring. When the introduction of propylene was ended, the polymerization started. Thus, the polymerization was conducted for 8 hours. Thereafter, stirring was stopped, and the reaction solution was added to 5 L of methanol cooled to −60° C. to precipitate the resultant polymer, thereby terminating the polymerization. The resultant rude polymer was washed with methanol 5 times, and then dried at room temperature. The yield of polypropylene was 19 g. The Mw, Mw/Mn, solubility in toluene [g/100 g (25° C.)] and racemic diad fraction [r] of the polypropylene are shown in Table 1.

(3) Formation of Coating Layer

Using the polypropylene obtained in the above step (2), a microporous composite membrane was produced by forming a coating layer in the same manner as in Example 1. The amount of polypropylene coated is shown in Table 1.

(4) Production of Lithium Secondary Battery

Using the microporous composite membrane obtained in the above step (3), a lithium secondary battery was produced in the same manner as in Example 1.

EXAMPLE 7

A microporous composite membrane was produced in the same manner as in Example 1, except for applying a solution of polypropylene in toluene to one surface of the microporous polyethylene membrane by a gravure coater method. The amount of polypropylene coated is shown in Table 1. Using the microporous composite membrane, a lithium secondary battery was produced in the same manner as in Example 1.

COMPARATIVE EXAMPLE 1

Using the microporous polyethylene membrane produced in the same manner as in Example 1, a lithium secondary battery was produced in the same manner as in Example 1.

COMPARATIVE EXAMPLE 2

A microporous composite membrane was produced in the same manner as in Example 1 except for changing the concentration of the polypropylene solution in toluene to 0.2% by mass. The amount of polypropylene coated is shown in Table 1. Using the resultant microporous composite membrane, a lithium secondary battery was produced in the same manner as in Example 1.

COMPARATIVE EXAMPLE 3

A microporous composite membrane was produced in the same manner as in Example 1 except for changing the concentration of the polypropylene solution in toluene to 12% by mass. The amount of polypropylene coated is shown in Table 1. Using the microporous composite membrane, a lithium secondary battery was produced in the same manner as in Example 1.

COMPARATIVE EXAMPLE 4

(1) Production of Microporous Polyethylene Membrane

A microporous polyethylene membrane was produced in the same manner as in Example 1.

(2) Preparation of Polypropylene 25 ml of a solution of ethylaluminum dibromide in toluene (concentration: 2 mol/L), and 150 ml of toluene were charged into a stirrer-equipped, four-neck flask filled with nitrogen, and 8.3 mol of propylene was introduced, and cooled to −78° C. while stirring. While keeping at −78° C., 50 ml of a solution of V(acetylacetonate)$_3$ in toluene (concentration: 0.1 mol/L) was added to start polymerization. After the polymerization was conducted for 2 hours 30 minutes, stirring was stopped, and the reaction liquid was poured into 2 L of an ethanol-hydrochloric acid solution cooled to −78° C. The resultant rude polymer was washed with 1 L of ethanol 5 times, and then vacuum-dried at room temperature to obtain 1.4 g of polypropylene. The Mw, Mw/Mn, solubility in toluene [g/100 g (25° C.)] and racemic diad fraction [r] of the polypropylene are shown in Table 1.

(3) Formation of Coating Layer

Using polypropylene obtained in the above step (2), a microporous composite membrane was produced by forming a coating layer in the same manner as in Example 1. The amount of polypropylene coated is shown in Table 1.

(4) Production of Lithium Secondary Battery

Using the microporous composite membrane obtained in the above step (3), a lithium secondary battery was produced in the same manner as in Example 1.

COMPARATIVE EXAMPLE 5

(1) Production of Microporous Polyethylene Membrane

A microporous polyethylene membrane was produced in the same manner as in Example 1.

(2) Preparation of Polypropylene 10 ml of a solution of B(C$_6$F$_5$)$_3$ in toluene (concentration: 0.4 mol/L), 10 ml of solution of Al(n-C$_8$H$_{17}$)$_2$Cl in toluene (concentration: 4 mol/L), and 150 ml of toluene were charged into a stirrer-equipped, four-neck flask filled with nitrogen, and 8.3 mol of propylene was introduced, and cooled to −60° C. while stirring. While keeping at −60° C., 10 ml of a solution of Me$_2$C(CpFlu)ZrMe$_2$ in toluene (concentration: 0.1 mol/L) was added to start polymerization. After the polymerization was conducted for 2 hours, stirring was stopped, and the reaction liquid was poured into 2 L of an ethanol-hydrochloric acid solution cooled to −78° C. The resultant rude polymer was washed with 1 L of ethanol 5 times, and then vacuum-dried at room temperature to obtain 4.3 g of polypropylene. The Mw, Mw/Mn, solubility in toluene [g/100 g (25° C.)] and racemic diad fraction [r] of the polypropylene are shown in Table 1.

(3) Formation of Coating Layer

Toluene was added such that the polypropylene obtained in the above step (2) became 2% by mass, and stirring was conducted at room temperature for 12 hours. However, it was not dissolved, failing to prepare a coating liquid.

COMPARATIVE EXAMPLE 6

(1) Production of Microporous Polyethylene Membrane

A microporous polyethylene membrane was produced in the same manner as in Example 1.

(2) Preparation of Polypropylene

A Ti catalyst carried by $MgCl_2$ was produced in the same manner as in Example 1 in JP63-264607A. Using this catalyst, polypropylene was prepared in the same manner as in Applied Example 1 in JP63-264607A except for changing the amount of a hydrogen gas to 1500 ml. The Mw, Mw/Mn, solubility in toluene [g/100 g (25° C.)] and racemic diad fraction [r] of the polypropylene are shown in Table 1.

(3) Formation of Coating Layer

Toluene was added such that the polypropylene obtained in the above step (2) became 2% by mass, and stirring was conducted at room temperature for 12 hours. However, it was not dissolved, failing to prepare a coating liquid.

COMPARATIVE EXAMPLE 7

(1) Production of Microporous Polyethylene Membrane

A microporous polyethylene membrane was produced in the same manner as in Example 1.

(2) Preparation of Polypropylene

Polypropylene was prepared in the same manner as in Comparative Example 6.

(3) Formation of Coating Layer

Decalin was added to the polypropylene obtained in the above step (2), and stirred at a temperature of 120° C. for 12 hours to prepare a 2-%-by-mass solution. While keeping at 120° C., this polypropylene solution was applied to the microporous polyethylene membrane by a dip-coater method. However, the microporous polyethylene membrane was ruptured.

COMPARATIVE EXAMPLE 8

Using a commercially available, microporous polypropylene membrane (Celgard 2400 available from Celgard Inc.), a lithium secondary battery was produced in the same manner as in Example 1.

COMPARATIVE EXAMPLE 9

Using a commercially available, three-layer, microporous membrane constituted by a polypropylene layer, a polyethylene layer and a polypropylene layer (Celgard 2300 available from Celgard Inc.), a lithium secondary battery was produced in the same manner as in Example 1.

With respect to the microporous polyethylene membranes and microporous composite membranes produced in Examples 1-7 and Comparative Examples 2-4, the microporous polyethylene membranes produced in Comparative Example 1, 5-7, and the commercially available microporous membrane used in Comparative Examples 8, 9, their properties were measured by the following methods. The results are shown in Table 1.

(1) Thickness: Measured by a contact thickness meter available from Mitutoyo Corporation.

(2) Porosity: Measured by a weight method.

(3) Air permeability: Measured according to JIS P8117 (converted to the value at 25-µm thickness).

(4) Pin puncture strength: The microporous composite membrane was pricked with a needle of 1 mm in diameter (0.5 mm R) at a speed of 2 mm/second to measure the maximum load, which was converted to the value of a 20-µm-thick membrane.

(5) Shutdown temperature: A temperature at which the air permeability became 100,000 seconds/100 cc or more by heating was measured.

(6) Meltdown temperature: A temperature at which the membrane was ruptured by melting by heating was measured.

(7) Mw and molecular weight distribution: Determined from integration curves obtained by the gel permeation chromatography (GPC) measurement under the following conditions:

Measurement apparatus: GPC-150C available from Waters Corporation,

Column: Shodex UT806M available from Showa Denko K.K.,

Column temperature: 135° C.,

Solvent: o-dichlorobenzene,

Solvent flow rate: 1.0 ml/minute,

Sample concentration: 0.1% by weight (dissolved at 135° C. for 1 hour),

Injected amount: 500 µl, and

Calibration curve of polypropylene: Produced using a calibration curve of a single-dispersion, standard polystyrene sample.

(8) Racemic dyad fraction [r]: Determined from the integrated value of peak intensity obtained by $^{13}$C-NMR measurement under the following conditions.

Measuring apparatus: XL-200 NMR with pulse Fourier transformer PFT available from Varian Inc., Frequency: 50 MHz, Temperature: 120° C., Pulse width: 8.2 µsπ/3, Pulse interval: 4 seconds, Number of integration: 5,000, and Sample: Prepared by dissolving polypropylene in a mixed solvent of trichlorobenzene and benzene (volume ratio of trichlorobenzene/benzene=2/1).

(9) Uniformity of coating layer: Observed by the naked eye. The evaluation are shown by "Good" or "Poor."

The high-temperature storability (capacity recovery ratio) of the lithium secondary batteries produced in Examples 1-7 and Comparative Examples 1-4, 8, 9 were measured as follows. First, the discharge capacity (initial capacity) of each lithium secondary battery was measured by a charge/discharge tester before high-temperature storing, and after stored at a temperature of 80° C. for 30 days, the discharge capacity was measured again by the same method. The capacity recovery ratio (%) was calculated by the equation of: (capacity after high-temperature storing/initial capacity)× 100. The results are shown in Table 1.

TABLE 1

| | Example 1 | Example 2 | Example 3 | Example 4 |
|---|---|---|---|---|
| Microporous Polyolefin Membrane | | | | |
| Polyolefin (PO) Composition | | | | |
| UHMWPE | | | | |
| Mw | $2.0 \times 10^6$ | $2.0 \times 10^6$ | $2.0 \times 10^6$ | $2.0 \times 10^6$ |
| Content (% by mass) | 30 | 30 | 30 | 30 |
| HDPE | | | | |
| Mw | $3.5 \times 10^5$ | $3.5 \times 10^5$ | $3.5 \times 10^5$ | $3.5 \times 10^5$ |
| Content (% by mass) | 70 | 70 | 70 | 70 |
| (Mw/Mn)/Tm (° C.)/Tcd (° C.)[1] | 16.8/135/90 | 16.8/135/90 | 16.8/135/90 | 16.8/135/90 |
| | Melt Blend | | | |
| Membrane-Forming Solvent | Liquid Paraffin | Liquid Paraffin | Liquid Paraffin | Liquid Paraffin |
| Conc. of PO Composition (% by mass) | 30 | 30 | 30 | 30 |
| Membrane-Forming Conditions | | | | |
| Stretching Temperature (° C.) | 112 | 112 | 112 | 112 |
| Stretching Magnification (MD × TD)[2] | 5 × 5 | 5 × 5 | 5 × 5 | 5 × 5 |
| Heat-Setting Temp. and Time (° C./min.) | 125/10 | 125/10 | 125/10 | 125/10 |
| Properties of Microporous Polyolefin Membrane | | | | |
| Thickness (μm) | 23.2 | 23.2 | 23.2 | 23.2 |
| Porosity (%) | 39.6 | 39.6 | 39.6 | 39.6 |
| Air Permeability (sec/100 cc) | 514 | 514 | 514 | 514 |
| Pin Puncture Strength (mN) | 6370 | 6370 | 6370 | 6370 |
| Shutdown Temperature (° C.) | 135 | 135 | 135 | 135 |
| Meltdown Temperature (° C.) | 160 | 160 | 160 | 160 |
| Polypropylene Coating Layer | | | | |
| Polypropylene (PP) | | | | |
| Mw | 68000 | 68000 | 68000 | 10000 |
| Mw/Mn | 1.5 | 1.5 | 1.5 | 2 |
| Solubility in Toluene[3] [g/100 g (25° C.)] | ≧15 | ≧15 | ≧15 | ≧15 |
| Racemic Diad Fraction [r] | 0.79 | 0.79 | 0.79 | 0.59 |
| Coating Conditions | | | | |
| Coated Surface | Both Surfaces | Both Surfaces | Both Surfaces | Both Surfaces |
| Conc. of PP solution (% by mass) | 2 | 5 | 8 | 2 |
| Coating Layer | | | | |
| Coated PP (g/m²) | 0.78 | 1.68 | 2.25 | 0.96 |
| Uniformity | Good | Good | Good | Good |
| Properties of Microporous Composite Membrane | | | | |
| Thickness (μm) | 23.4 | 23.9 | 24.3 | 23.5 |
| Porosity (%) | 37.4 | 32.6 | 29.8 | 34.5 |
| Air Permeability (sec/100 cc) | 765 | 1468 | 1781 | 1092 |
| Pin Puncture Strength (mN) | 6517 | 6762 | 7154 | 6566 |
| Shutdown Temperature (° C.) | 135 | 135 | 135 | 135 |
| Meltdown Temperature (° C.) | 165 | 165 | 165 | 160 |
| High-Temperature Storability of Lithium Secondary Battery | | | | |
| Capacity Recovery Ratio (%)[4] | 75 | 80 | >80 | 75 |

| | Example 5 | Example 6 | Example 7 | Comp. Ex. 1 |
|---|---|---|---|---|
| Microporous Polyolefin Membrane | | | | |
| Polyolefin (PO) Composition | | | | |
| UHMWPE | | | | |
| Mw | $2.0 \times 10^6$ | $2.0 \times 10^6$ | $2.0 \times 10^6$ | $2.0 \times 10^6$ |
| Content (% by mass) | 30 | 30 | 30 | 30 |
| HDPE | | | | |
| Mw | $3.5 \times 10^5$ | $3.5 \times 10^5$ | $3.5 \times 10^5$ | $3.5 \times 10^5$ |
| Content (% by mass) | 70 | 70 | 70 | 70 |
| (Mw/Mn)/Tm (° C.)/Tcd (° C.)[1] | 16.8/135/90 | 16.8/135/90 | 16.8/135/90 | 16.8/135/90 |

TABLE 1-continued

| | | | | |
|---|---|---|---|---|
| Melt Blend | | | | |
| Membrane-Forming Solvent | Liquid Paraffin | Liquid Paraffin | Liquid Paraffin | Liquid Paraffin |
| Conc. of PO Composition (% by mass) | 30 | 30 | 30 | 30 |
| Membrane-Forming Conditions | | | | |
| Stretching Temperature (° C.) | 112 | 112 | 112 | 112 |
| Stretching Magnification (MD × TD)[2] | 5 × 5 | 5 × 5 | 5 × 5 | 5 × 5 |
| Heat-Setting Temp. and Time (° C./min.) | 125/10 | 125/10 | 125/10 | 125/10 |
| Properties of Microporous Polyolefin Membrane | | | | |
| Thickness (μm) | 23.2 | 23.2 | 23.2 | 23.2 |
| Porosity (%) | 39.6 | 39.6 | 39.6 | 39.6 |
| Air Permeability (sec/100 cc) | 514 | 514 | 514 | 514 |
| Pin Puncture Strength (mN) | 6370 | 6370 | 6370 | 6370 |
| Shutdown Temperature (° C.) | 135 | 135 | 135 | 135 |
| Meltdown Temperature (° C.) | 160 | 160 | 160 | 160 |
| Polypropylene Coating Layer | | | | |
| Polypropylene (PP) | | | | |
| Mw | 260000 | 51000 | 68000 | — |
| Mw/Mn | 1.1 | 2.0 | 1.5 | — |
| Solubility in Toluene[3] [g/100 g (25° C.)] | ≧15 | ≧15 | ≧15 | — |
| Racemic Diad Fraction [r] | 0.7 | 0.17 | 0.79 | — |
| Coating Conditions | | | | |
| Coated Surface | Both Surfaces | Both Surfaces | One Surface | — |
| Conc. of PP solution (% by mass) | 5 | 2 | 2 | — |
| Coating Layer | | | | |
| Coated PP (g/m$^2$) | 1.21 | 0.83 | 0.51 | — |
| Uniformity | Good | Good | Good | — |
| Properties of Microporous Composite Membrane | | | | |
| Thickness (μm) | 23.8 | 23.8 | 23.5 | — |
| Porosity (%) | 35.2 | 36.8 | 36.8 | — |
| Air Permeability (sec/100 cc) | 954 | 802 | 746 | — |
| Pin Puncture Strength (mN) | 6566 | 6664 | 6468 | — |
| Shutdown Temperature (° C.) | 135 | 135 | 135 | — |
| Meltdown Temperature (° C.) | 165 | 165 | 165 | — |
| High-Temperature Storability of Lithium Secondary Battery | | | | |
| Capacity Recovery Ratio (%)[4] | 80 | 80 | 75 | 60 |

| | No. | | | |
|---|---|---|---|---|
| | Comp. Ex. 2 | Comp. Ex. 3 | Comp. Ex. 4 | Comp. Ex. 5 |
| Microporous Polyolefin Membrane | | | | |
| Polyolefin (PO) Composition | | | | |
| UHMWPE | | | | |
| Mw | $2.0 \times 10^6$ | $2.0 \times 10^6$ | $2.0 \times 10^6$ | $2.0 \times 10^6$ |
| Content (% by mass) | 30 | 30 | 30 | 30 |
| HDPE | | | | |
| Mw | $3.5 \times 10^5$ | $3.5 \times 10^5$ | $3.5 \times 10^5$ | $3.5 \times 10^5$ |
| Content (% by mass) | 70 | 70 | 70 | 70 |
| (Mw/Mn)/Tm (° C.)/Tcd (° C.)[1] | 16.8/135/90 | 16.8/135/90 | 16.8/135/90 | 16.8/135/90 |
| Melt Blend | | | | |
| Membrane-Forming Solvent | Liquid Paraffin | Liquid Paraffin | Liquid Paraffin | Liquid Paraffin |
| Conc. of PO Composition (% by mass) | 30 | 30 | 30 | 30 |
| Membrane-Forming Conditions | | | | |
| Stretching Temperature (° C.) | 112 | 112 | 112 | 112 |
| Stretching Magnification (MD × TD)[2] | 5 × 5 | 5 × 5 | 5 × 5 | 5 × 5 |
| Heat-Setting Temp. and Time (° C./min.) | 125/10 | 125/10 | 125/10 | 125/10 |
| Properties of Microporous Polyolefin Membrane | | | | |
| Thickness (μm) | 23.2 | 23.2 | 23.2 | 23.2 |
| Porosity (%) | 39.6 | 39.6 | 39.6 | 39.6 |
| Air Permeability (sec/100 cc) | 514 | 514 | 514 | 514 |
| Pin Puncture Strength (mN) | 6370 | 6370 | 6370 | 6370 |

TABLE 1-continued

|  |  |  |  |  |
|---|---|---|---|---|
| Shutdown Temperature (° C.) | 135 | 135 | 135 | 135 |
| Meltdown Temperature (° C.) | 160 | 160 | 160 | 160 |
| Polypropylene Coating Layer | | | | |
| Polypropylene (PP) | | | | |
| Mw | 68000 | 68000 | 3000 | 94000 |
| Mw/Mn | 1.5 | 1.5 | 1.4 | 1.8 |
| Solubility in Toluene[3] [g/100 g (25° C.)] | $\geq 15$ | $\geq 15$ | $\geq 15$ | $\leq 0.1$ |
| Racemic Diad Fraction [r] | 0.79 | 0.79 | 0.66 | 0.94 |
| Coating Conditions | | | | |
| Coated Surface | Both Surfaces | Both Surfaces | Both Surfaces | — |
| Conc. of PP solution (% by mass) | 0.2 | 12 | 2 | 2[5] |
| Coating Layer | | | | |
| Coated PP (g/m$^2$) | 0.03 | 5.81 | 2.55 | — |
| Uniformity | Good | Poor | Good | — |
| Properties of Microporous Composite Membrane | | | | |
| Thickness (μm) | 23.3 | 28.1 | 24.6 | — |
| Porosity (%) | 39.5 | 26.5 | 27.2 | — |
| Air Permeability (sec/100 cc) | 519 | 21216 | 19456 | — |
| Pin Puncture Strength (mN) | 6370 | 7252 | 6468 | — |
| Shutdown Temperature (° C.) | 135 | 135 | 135 | — |
| Meltdown Temperature (° C.) | 160 | 165 | 160 | — |
| High-Temperature Storability of Lithium Secondary Battery | | | | |
| Capacity Recovery Ratio (%)[4] | 60 | 65 | 60 | — |

|  | No. | | | |
|---|---|---|---|---|
|  | Comp. Ex. 6 | Comp. Ex. 7 | Comp. Ex. 8[6] | Comp. Ex. 9[7] |
| Microporous Polyolefin Membrane | | | | |
| Polyolefin (PO) Composition | | | | |
| UHMWPE | | | | |
| Mw | $2.0 \times 10^6$ | $2.0 \times 10^6$ | — | — |
| Content (% by mass) | 30 | 30 | — | — |
| HDPE | | | | |
| Mw | $3.5 \times 10^5$ | $3.5 \times 10^5$ | — | — |
| Content (% by mass) | 70 | 70 | — | — |
| (Mw/Mn)/Tm (° C.)/Tcd (° C.)[1] | 16.8/135/90 | 16.8/135/90 | — | — |
| Melt Blend | | | | |
| Membrane-Forming Solvent | Liquid Paraffin | Liquid Paraffin | — | — |
| Conc. of PO Composition (% by mass) | 30 | 30 | — | — |
| Membrane-Forming Conditions | | | | |
| Stretching Temperature (° C.) | 112 | 112 | — | — |
| Stretching Magnification (MD × TD)[2] | 5 × 5 | 5 × 5 | — | — |
| Heat-Setting Temp. and Time (° C./min.) | 125/10 | 125/10 | — | — |
| Properties of Microporous Polyolefin Membrane | | | | |
| Thickness (μm) | 23.2 | 23.6 | — | — |
| Porosity (%) | 39.6 | 39.6 | — | — |
| Air Permeability (sec/100 cc) | 514 | 514 | — | — |
| Pin Puncture Strength (mN) | 6370 | 6370 | — | — |
| Shutdown Temperature (° C.) | 135 | 135 | — | — |
| Meltdown Temperature (° C.) | 160 | 160 | — | — |
| Polypropylene Coating Layer | | | | |
| Polypropylene (PP) | | | | |
| Molecular Weight (Mw) | 142000 | 142000 | — | — |
| Mw/Mn | 5.7 | 5.7 | — | — |
| Solubility in Toluene[3] [g/100 g (25° C.)] | <0.1 | <0.1 | — | — |
| Racemic Diad Fraction [r] | 0.01 | 0.01 | — | — |
| Coating Conditions | | | | |
| Coated Surface | — | Both Surfaces | — | — |
| Conc. of PP solution (% by mass) | 2[5] | 2 | — | — |

TABLE 1-continued

|  | Coating Layer | | | |
| --- | --- | --- | --- | --- |
| Coated PP (g/m²) | — | — | — | — |
| Uniformity | — | — | — | — |
| Properties of Microporous Composite Membrane | | | | |
| Thickness (μm) | — | Ruptured | 25 | 25 |
| Porosity (%) | — | — | 35 | 38 |
| Air Permeability (sec/100 cc) | — | — | 700 | 550 |
| Pin Puncture Strength (mN) | — | — | 3773 | 4312 |
| Shutdown Temperature (° C.) | — | — | 165 | 145 |
| Meltdown Temperature (° C.) | — | — | 175 | 175 |
| High-Temperature Storability of Lithium Secondary Battery | | | | |
| Capacity Recovery Ratio (%)⁽⁴⁾ | — | — | >80 | >80 |

Note:
⁽¹⁾Tm represents a melting point, and Tcd represents a crystal dispersion temperature.
⁽²⁾Times in MD and TD.
⁽³⁾Solubility in 100 g of toluene at a temperature of 25° C.
⁽⁴⁾(Capacity after high-temperature storing/initial capacity) × 100.
⁽⁵⁾Not dissolved.
⁽⁶⁾Commercially available microporous polypropylene membrane.
⁽⁷⁾Commercially available three-layer microporous membrane.

As shown in Table 1, the microporous composite membranes of Examples 1-7 produced by the method of the present invention had well-balanced porosity, air permeability, pin puncture strength, shutdown temperature, meltdown temperature and high-temperature storability. On the other hand, Comparative Example 1 was poor in high-temperature storability, because a coating layer was not formed. Comparative Example 2 was poor in high-temperature storability, because the amount of the polypropylene layer formed was less than 0.1 g/m². Comparative Example 3 was poor in air permeability because the amount of the polypropylene layer formed was more than 5 g/m², and poor in high-temperature storability because the polypropylene layer was non-uniform. Comparative Example 4 was poor in air permeability and high-temperature storability, because the Mw of polypropylene was outside the range of the present invention. In Comparative Examples 5-7, because the solubility of polypropylene in toluene was outside the range of the present invention, a coating liquid in toluene as a solvent could not be prepared. Particularly in Comparative Example 7, a coating liquid was prepared using only decalin, a poor solvent, coating was conducted at a high temperature (120° C.), resulting in the rupture of the microporous polyethylene membrane. The microporous membrane of Comparative Example 8 composed of polypropylene had too high shutdown temperature and thus poor battery safety. The microporous membrane of Comparative Example 9 had too high shutdown temperature and thus poor battery safety, though it had a three-layer structure of a polypropylene layer a polyethylene layer and a polypropylene layer.

EFFECT OF THE INVENTION

Because the microporous composite membrane of the present invention is provided with a coating layer containing polypropylene having Mw within a range of 5,000-500,000, and solubility of 0.5 g or more in 100 g of toluene at a temperature of 25° C., and because it has air permeability (converted to the value at 25-μm thickness) of 50-10,000 seconds/100 cc, preferably 100-3,000 seconds/100 cc, it is excellent in the balance of permeability, mechanical strength, shutdown properties, meltdown properties and high-temperature storability.

When the microporous composite membrane of the present invention is used for battery separators, it suffers little deterioration in a cycle life and a storing life at high temperatures. In addition, it is well impregnated with an electrolytic solution in the process of producing batteries, and can keep low interface resistance between electrodes and separators without having gaps between battery-constituting elements even after the repetition of charge and discharge. Accordingly, the microporous composite membrane of the present invention can provide batteries with excellent safety and reliability. Further, because the microporous composite membrane of the present invention has excellent wettability to liquid chemicals, separatability, permeability and mechanical strength, it is suitable as separation membranes.

What is claimed is:

1. A lithium secondary battery separator formed by a microporous composite membrane comprising a microporous polyethylene membrane and a polypropylene coating layer formed on at least one surface of said microporous polyethylene membrane, wherein said polypropylene has a mass-average molecular weight within a range of 5,000-500,000, a racemic diad fraction [r] within a range of 0.16-0.84, and solubility of 0.5 g or more in 100 g of toluene at a temperature of 25° C., wherein 0.1-5 g of said coating layer is formed on one or both surfaces of said microporous polyethylene membrane per 1 m², and wherein said microporous composite membrane has the following properties (1)-(6): (1) an air permeability (converted to the value at 25-μm thickness) of 100-3,000 seconds/100 cc, (2) a porosity of 25-95%, (3) a pin puncture strength of 5,000 mN/25 m or more, (4) a shutdown temperature of 120-140° C., (5) a meltdown temperature of 155° C. or higher, and (6) a battery capacity recovery ratio after storing at 80° C. for 30 days [(battery capacity after storing/initial battery capacity)×100] of 70% or more in a lithium secondary battery.

2. A method for producing the lithium secondary battery separator of claim 1, comprising:
(a) applying a mixed liquid containing said polypropylene and its good solvent to at least one surface of said microporous polyethylene membrane, removing said good solvent to increase the concentration of said polypropylene, thereby providing the resultant coating layer with a structure in which said polypropylene phase is separated from said good solvent phase, and then removing the remainder of said good solvent;

(b) applying said mixed liquid to at least one surface of said microporous polyethylene membrane, cooling the resultant coating layer to provide the coating layer with a structure in which said polypropylene phase is separated from said good solvent phase, and removing said good solvent;

(c) applying said mixed liquid to at least one surface of said microporous polyethylene membrane, bringing the resultant coating layer into contact with poor solvent for said polypropylene, selectively evaporating said good solvent to provide said coating layer with a structure in which said polypropylene phase is separated from said poor solvent phase, and then removing said poor solvent; or (d) applying a mixed liquid containing said polypropylene, said good solvent and said poor solvent to at least one surface of said microporous polyethylene membrane, selectively removing said good solvent to provide the resultant coating layer with a structure in which said polypropylene phase is separated from said poor solvent phase, and then removing said poor solvent.

3. A battery comprising the lithium secondary battery separator of claim 1.

* * * * *